United States Patent [19]
Schipper

[11] Patent Number: 5,815,118
[45] Date of Patent: *Sep. 29, 1998

[54] RUBBER SHEETING OF A MAP

[75] Inventor: John F. Schipper, Palo Alto, Calif.

[73] Assignee: Trimble Navigation Limited, Sunnyvale, Calif.

[*] Notice: The term of this patent shall not extend beyond the expiration date of Pat. No. 5,581,259.

[21] Appl. No.: 757,614

[22] Filed: Nov. 29, 1996

Related U.S. Application Data

[63] Continuation of Ser. No. 333,855, Nov. 3, 1994, Pat. No. 5,581,259.

[51] Int. Cl.$^6$ ..................................................... G01S 3/02
[52] U.S. Cl. ............................................................ 342/451
[58] Field of Search ................................. 342/450, 457, 342/451, 357; 364/449.2

[56] References Cited

U.S. PATENT DOCUMENTS

| | | | |
|---|---|---|---|
| 4,791,572 | 12/1988 | Green, III et al. | 364/452 |
| 4,891,761 | 1/1990 | Gray et al. | 364/452 |
| 5,278,763 | 1/1994 | Agnew et al. | 364/443 |
| 5,581,259 | 12/1996 | Schipper | 342/451 |

*Primary Examiner*—Gregory C. Issing
*Attorney, Agent, or Firm*—John Schipper

[57] ABSTRACT

Methods for determining the present location coordinates of a user moving in a two-dimensional or three-dimensional space, with reference to an old map that may be inaccurate. Location coordinates of two or three non-collinear landmarks in two dimensions, or coordinates of three or four non-coplanar landmarks in three-dimensions, are indicated on the old map. Corresponding location coordinates are also estimated using a location determination (LD) system, such as GPS, GLONASS, Loran, Tacan, Decca, Omega, VOR, DME, JTIDS, PLRS or an FM subcarrier system. Location coordinates for two or more physical landmarks can be used to determine coordinates for a landmark representative. The user's location coordinates are also determined or provided using the LD system. A distance or separation vector from the user location to landmark number i ($i=1, \ldots, N; N=2,3$) is computed in the LD system. Two or more locations are computed on the old map for which the estimated distance (or estimated vector) from landmark number i to the computed location on the old map is also equal to the computed distance (or computed vector), and one of these computed locations is designated as a user location on the old map. Several metrics are developed to measure the relative acceptability of an old map user location, as determined above.

12 Claims, 7 Drawing Sheets

RUBBER SHEETING OF A MAP

FIELD OF THE INVENTION

This application is a continuation of a patent application entitled "NEW LIFE FOR OLD MAPS" U.S. Ser. No. 08/333,855, filed on 3 Nov. 1994 and now U.S. Pat. No. 5,581,259 and assigned to the same assignee as this application. This invention relates to navigation using a map with map locations that are modified to increase the map accuracy.

BACKGROUND OF THE INVENTION

In a recent issue of a marine activity magazine, one writer recommended against using Global Positioning System (GPS) navigation equipment because, paradoxically, this system is too accurate. Many of the maps used by operators of small and medium size boats still use maps prepared by U.S. Navy and Coast Guard personnel in earlier decades when the measurement methods had estimated inaccuracies as large as hundreds of meters. Use of GPS navigation information in the open oceans and seas is not a problem, because use of this information is not tied to nearby terrestrial monuments or landmarks. However, when a boat is operating in, say, the California Delta region or on a river with many tributaries, use of nearby terrestrial monuments is natural and to be expected. If the boat operator attempts to reconcile the discrepancies between the old Navy/Coast Guard maps, visually perceptible landmarks and GPS navigation information, the operator can become disoriented.

Maps and charts have been prepared and used in connection with various location determination systems (LDSs), such as GPS, GLONASS, Loran, Tacan, Decca, Omega, VOR, DME, JTIDS, PLRS and an FM subcarrier system. DiMatteo et al, in U.S. Pat. No. 4,135,190, disclose a navigational plotter system including a geographical map with location lines prepared with the aid of a Loran or Omega LDS. Intersections of location lines with coordinate baselines located on the map are recorded in coded form for direct readout of a selected location, for tracking of location and/or movement of a vehicle or vessel across the two-dimensional surface represented by the map.

A navigation display that provides a continuous pictorial or graphical display of the present location of a movable vehicle or vessel, using an LDS such as VOR, Loran, ADF, DME or Tacan, is disclosed by Scovill in U.S. Pat. No. 4,253,150. The charts are stored on photographic film, and the portion of the film displayed is varied to include the present location. This system can be used to provide readout of present ground speed of the vehicle or vessel, bearing, and estimated time to reach a waypoint or the destination. Most of the discussion is concerned with positioning of the portion of the film displayed.

In U.S. Pat. No. 4,428,052, Robinson et al disclose a navigational aid and autopilot system that includes display of a selected portion of a chart showing the location of a vehicle or vessel being tracked. The vehicle or vessel location may be shown at the center or near an edge of the portion of the chart displayed. Water and nearby land masses may be displayed on the selected portion of the chart, as well as relevant information such as the depth of the water at a location near a land mass.

Setliff et al disclose an electronic chart system that stores and visually displays a plurality of charts or maps digitally, where the charts have been prepared using a location determination system, such as Loran, in U.S. Pat. No. 4,428,057. The visually displayed image can be compressed or expanded to meet the current needs of the viewer. Each point on the chart is given an index, indicating whether that point is "land" or "water." Navigation information, such as location and bearing for a moving object, is available.

A navigation system, including an integrated electronic display for charts or maps prepared by a location determination system such as Loran or Decca, is disclosed in U.S. Pat. No. 4,590,569, issued to Rogoff et al. A plurality of charts is stored digitally and displayed as needed, together with alphanumeric data such as location coordinates, bearing, waypoints, and estimated time before arrival at a waypoint or destination. Radar return signals are received from nearby land masses, and this information is superimposed on the stored images in some situations. If the object tracked is located off-shore, the off-shore LDS receives (Loran) offset data from a plurality of on-shore LDS monitors to periodically correct the location of the off-shore object.

U.S. Pat. No. 4,685,068, issued to Greco et al, discloses a map digitization and feature extraction system that uses pattern recognition to add editable features, such as terrain elevation, vegetation, water storage and transport facilities, and electrical communication lines, to an electronic map that is being assembled. The added features are drawn from one or more separate databases, and features of the same class can be given the same color for display. A first visual display monitor for an interim or working display and a second monitor for final display, are preferably positioned adjacent to each other. A paper map, used for feature placement or details, is cut or sectioned into rectangles of length a few km on a side, and the sections are scanned into a computer for storage and subsequent use.

Green et al disclose a method for accurately displaying location information, obtained from a Loran system, on a map in U.S. Pat. No. 4,791,572. The actual locations of various Loran antenna monuments are determined and used together with Loran data to enhance the accuracy of a location on the map, by distorting map grid lines if necessary. Reconciliation of a location shown on two different maps is not provided.

A map-aided navigation system that uses TERCOM-SITAN control signals is disclosed by U.S. Pat. No. 4,829,304, issued to Baird. An aircraft flies over terrain to be mapped and estimates aircraft location and altitude at a sequence of sampling points. These data are Kalman filtered, and the resulting filtered data are used to determine elevation and slope for this terrain. On a subsequent flight over this terrain, an aircraft uses altimeter sensing and the terrain map to determine the most likely flight path actually followed by the aircraft.

Gray et al disclose a method for accurately updating location information contained in a digital map, in U.S. Pat. No. 4,891,761. A vehicle is dispatched to a neighborhood of an unknown location, which may be a landmark that has not yet been surveyed. The vehicle moves along a segment between a known landmark, such as an already-surveyed intersection and the unknown location and transmits location information to a central station to produce an updated digital map.

A method for representing digitized image data for forming cross-sectional images of an object is disclosed by Essinger et al in U.S. Pat. No. 4,939,646. This method is useful in computer-assisted tomography, magnetic resonance imaging and other fields where three-dimensional representations are needed. A two-dimensional "slice" of a three-dimensional object is limited by a boundary curve, and image features within this curve are represented as locations in polar coordinates. A locus of points equidistant from and lying within the boundary curve is used for feature location and placement. Another method of digitizing two-dimensional sections of a three-dimensional object is disclosed by Koch in U.S. Pat. No. 5,231,470.

In U.S. Pat. No. 4,939,661, issued to Barker et al, a marine navigation system that represents locations in cells that cumulatively cover an entire region is disclosed. Only those cells that contain a portion of a coastline have much associated location data.

A vehicle navigation system that uses local topographical maps to correct an aircraft flight path is disclosed in U.S. Pat. No. 4,939,663, issued to Baird. During flight, local altitude measurements are made and used with a digital database containing local elevation (above a ground reference surface) of the Earth's surface. The location of the aircraft is sampled separately and is compared with the local elevation contour corresponding to the altimeter measurement; a location correction is determined that places the aircraft location over the elevation contour. Here, the local altitude coordinate of the aircraft is determined exclusively by the altimeter measurement, and the other two aircraft position coordinates are determined approximately by independent position sampling, which may use aircraft dead reckoning.

U.S. Pat. No. 4,982,332, issued to Saito et al, discloses a road data generating system is disclosed for use in an on-board vehicle navigation system. Locations of points on roads on a map are determined and stored, by reference of each such point to a nearest road intersection based on location data sensed by the moving vehicle. These data are compared with any extant location data for that road, and extant data are replaced on the map by new data at a given location that are believed to be more accurate than the extant data near that location.

Dedieu et al, in U.S. Pat. No. 4,998,212, disclose a method of representing a geographical map as an assembly of curvilinear trapezoids that fit together along their common edges, in a manner that approximates sections that occur on a globe surface of the Earth. The map sections are deformed and rotated and fitted together to provide a representation of a region of interest.

A map and text display system for aircraft navigation is disclosed by Factor et al in U.S. Pat. No. 5,057,835. The system stores terrain elevation information for regions adjacent to a flight path and compares the presently measured aircraft altitude with the maximum terrain elevation for the local region over which the aircraft is positioned, to determine if the aircraft altitude is above a safety threshold for that region. Aircraft latitude, longitude and altitude are determined conventionally, and no second source of aircraft altitude information is used to vary or improve the altitude estimate.

Currin et al disclose a method for forming a composite terrain map from a mosaic of component images in U.S. Pat. No. 5,187,734. Digitized two-dimensional orthographic projections of the component images are formed, high-pass filtered and merged with a digitized, low-pass filtered overview map to form a composite map. Warping, using two-dimensional warping polynomials, is employed to map the component images onto a common set of spatial coordinates on a larger map.

In U.S. Pat. No. 5,208,757, issued to Appriou et al, an on-board system for determination of the location of an airborne vessel, such as an aircraft, is disclosed. The spatial coordinates of discrete landmarks on the terrain below are entered into a computer memory. As the vessel flies over a landmark, the known location of this landmark is used to correct the location given by another navigation means that uses images of small portions of the terrain below for location determination. Kalman filtering is applied to the location of the vessel relative to the terrain.

An interactive automated mapping system that uses location information determined using a GPS is disclosed by Mauney et al in U.S. Pat. No. 5,214,757. Attributes related to location information can be entered, stored and subsequently displayed. The system creates new maps and/or annotates existing maps but does not provide reconciliation between an existing map and a new map.

U.S. Pat. No. 5,271,066, issued to Leonard, discloses apparatus for determining two-dimensional spatial coordinates on a map, using a viewing mechanism that allows scanning and digitization of designated points on the underlying map. An associated scanner can be rotated relative to the underlying map. Another rotatable scanner for capture of image data is disclosed by Faust et al in U.S. Pat. No. 5,280,370.

Interpolation image processing of a digital map is employed to determine pixel color is disclosed in U.S. Pat. No. 5,299,300, issued to Femal et al. Interpolation of pixel color or related data, for a plurality of pixels with spatial locations adjacent to the spatial location of a target pixel, is used to compute to compute the pixel data for the target pixel.

Bormans, in U.S. Pat. No. 5,325,482, discloses a system for adding new network data to an existing electronic map, stored in memory. A new map, containing only the new data, is superimposed on the existing map, and corresponding reference points on each map are incrementally moved until they coincide. A third electronic map is then prepared, combining the existing map features with the new data features. Interpolation of reference point locations is sometimes performed.

A system for correcting a compass heading for a vehicle is disclosed in U.S. Pat. No. 5,339,246, issued to Kao. Two or more magnetic compass heading readings are sensed, and a GPS-determined compensation factor is computed to adjust a magnetic heading value to a true heading as indicated by the GPS. The magnetic compass heading and GPS heading values are referenced to a single map.

In U.S. Pat. No. 5,345,086, Bertram discloses an automatic map compilation system that extracts three-dimensional surveying or similar information from a plurality of two-dimensional maps. A pair of stereoscopic maps, showing data on terrain and/or associated altitude(s), is scanned into a computer, and altitudes for topographic sections are determined, if desired. An orthographic image projection is prepared from the scanned-in data and may be displayed as a photograph or orthophoto. Three-dimensional coordinates of a point are determined two or more from two-dimensional views.

These approaches generally assume that the accuracies of the navigation or survey system and of the map or chart agree with or are consistent with each other, if two such maps or charts are used. Many of these approaches require use of scanned-in location and/or feature information so that a physical map, on paper or another similar substrate, cannot be used directly. If the map or chart used has associated inaccuracies that are much larger than the associated inaccuracies of the navigation system used, the accuracy of monitored and/or tracked locations will be no better than that of the map or chart. The conclusions drawn from use of such a map may be misleading, in an environment having many features that appear to be similar. What is needed is an approach that allows reconciliation of a more accurate navigation system with a less accurate physical map or chart to provide increased accuracy for the combination. Preferably, the accuracy of a location shown on the physical map should improve with improvement of the accuracy of the navigation system.

SUMMARY OF THE INVENTION

The invention meets this need by using two or more landmarks and other monuments contained in an "old" map, that is, a map that has not been reconstructed using the more accurate coordinates provided by a location determination system (LDS), such as SATPS, GPS, GLONASS, Loran, Tacan, Omega, Decca, JTIDS, PLRS and an FM subcarrier system. These landmark coordinates, as shown by the LDS, are used to determine the user's location relative to these landmarks on the old map, using location coordinate transformations of vectors and/or matrices or using range computations.

The invention reconciles the possibly-inconsistent information provided by the old map and by the LDS coordinates by the following approach. It is assumed that the user is near enough to land (or on land) so that two or more spaced apart physical landmarks can be identified. An old map for a region of interest may be used manually or may be entered as an electronic map, using the location coordinates provided with this map. When a location fix is needed, the user obtains LDS-based range and azimuth measurements from the present user location to two, three, four or more selected physical landmarks for which location coordinates are available on the old map. The old map may represent a two-dimensional surface, such as a portion of the Earth's surface, or may represent a three-dimensional region.

These measurements can be made for an LDS of suitable accuracy using the methods and equipment disclosed by Gilbert, Kersey and Janky in the patent application entitled "SATPS Mapping Angle Orientation Calibrator", U.S. Ser. No. 08/115,432 (now U.S. Pat. No. 5,379,045), or disclosed by Janky, Loomis and Schipper in the patent application entitled "Integrated Image Transfer For Remote Target Location", U.S. Ser. No. 08/191,815 (now U.S. Pat. No. 5,568,052). Any other suitable method and apparatus may be used for determination, at a distance, of the location coordinates of a landmark that is visible from the user's location. Alternatively, the LDS-determined location coordinates for these landmarks may be known ab initio from a previous survey. The LDS-determined location coordinates of the user are also determined.

In one class of embodiments of the invention, the LDS-determined location coordinates for the selected landmarks are transformed onto the location coordinates for the corresponding landmarks on the old map. The image under this transformation of the user location is then used to estimate the user location as shown on the old map. In a second class of embodiments, ranges from a plurality of selected landmarks to the LDS-determined user location are employed to estimate the user location shown on the old map.

By proceeding in this manner, a user need not replace an old map or maps, or use a scanned-in version of the old map, or await the promised preparation and issuance of new maps based on LDS information. Several metrics are developed as measures of the deviation of this estimated or designated user location relative to the LDS-determined user location.

DESCRIPTION OF BEST MODES OF THE INVENTION

Table 1 presents the location coordinates, both known and unknown, for locations as determined by the LDS and the corresponding locations as shown on the old map, in two dimensions. Where only two visible landmarks L1' and L2' with location coordinates (x1',y1') and (x2',y2') are shown on the old map, the corresponding LDS-determined location coordinates are (x1,y1) and (x2,y2), respectively. In this situation, the third landmark L3 in Table 1 plays no part. An origin O, with coordinates (0,0), and corresponding origin O' are chosen in the LDS and on the old map, respectively, and the LDS-determined location coordinates (xu,yu) of the user 10 are known. The origin O and the two landmark locations L1 and L2 must not be collinear on a map determined using the LDS (an "LDS map"). The landmark location coordinates (xi,yi) (i=1,2,3) may be known ab initio from a preceding survey. The corresponding user location coordinates (xu',yu') on the old map are unknown and are to be determined.

TABLE 1

| | Corresponding Two-dimensional Location Coordinates | |
|---|---|---|
| Item | On LDS Map | On Old Map |
| Origin | (0,0) | (0,0) |
| Landmark L1 | (x1,y1) | (x1',y1') |
| Landmark L2 | (x2,y2) | (x2',y2') |
| Landmark L3 | (x3,y3) | (x3',y3') |
| User location | (xu,yu) | (xu',yu') |

Figure 1A:
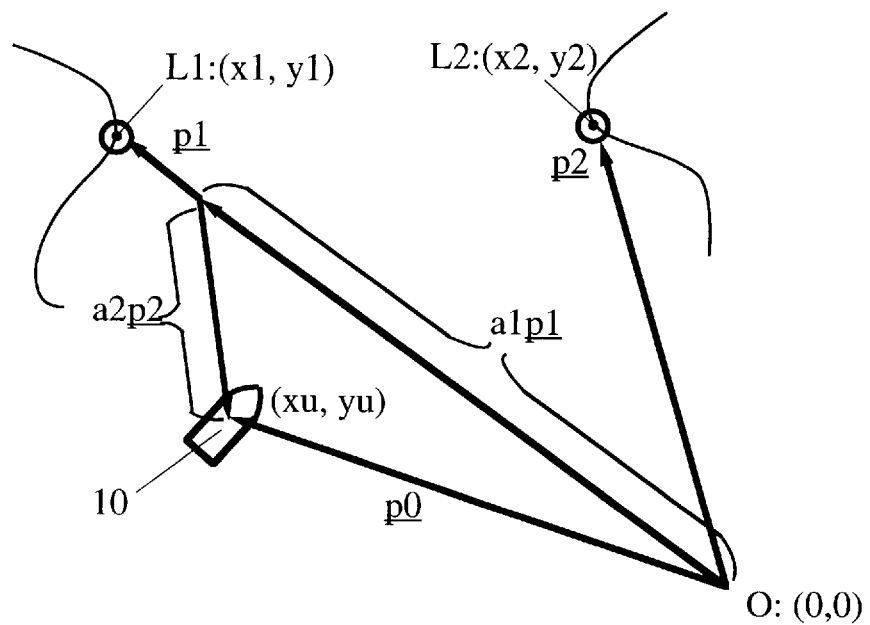
FIGS. 1A and 2A illustrate use of embodiments of the invention on a two-dimensional surface to determine and display an estimated user location on a map determined by an LDS, where location coordinates for two or three landmarks are available on an old map.
Figure 1B:
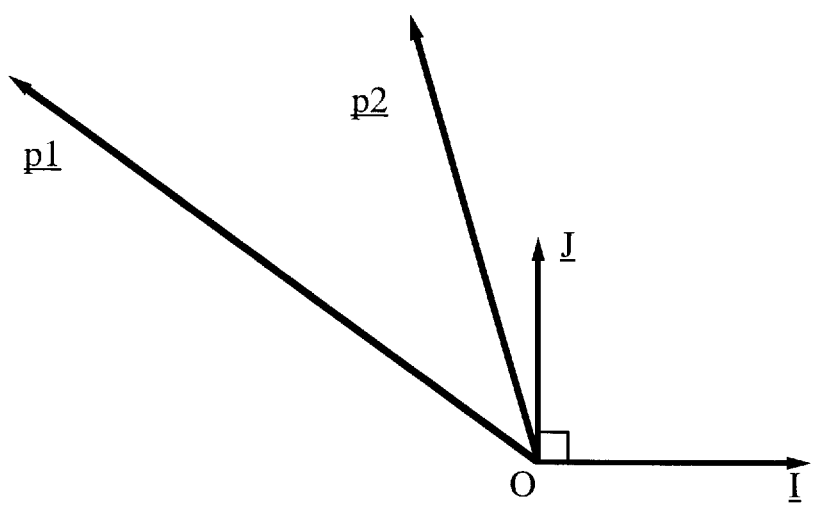
FIGS. 1B and 2B illustrate the relationships of certain vectors in FIGS. 1A and 2A, respectively, to a two-dimensional Cartesian coordinate system used in the invention (shown in reduced scale).

With reference to FIG. 1A, assume that the two-dimensional location coordinates (x1,y1) and (x2,y2) of two landmarks L1 and L2 and the location coordinates (xu,yu) of a user 10, such as a marine vessel or land vehicle, are determined, using an LDS on a two-dimensional surface. An origin or other reference location O is selected that is not collinear with the locations of the landmarks L1 and L2, and vectors $$p1 = x1I + y1J,\tag{1}$$

$$p2 = x2I + y2J,\tag{2}$$

directed from the origin O to the respective locations of the landmarks L1 and L2 are determined. As used herein, a "vector" is a quantity having both a magnitude (or length)

and a direction in the two-dimensional or three-dimensional space to which the vector refers. Here, I and J are orthogonal, unit length vectors in a Cartesian coordinate system (I,J,K), as indicated in FIG. 1B. The user location, as determined by the LDS, is written as a vector pu, with Cartesian coordinates (xu,yu), as a vector sum $$pu=xuI+yuJ=a1p1+a2p2, \quad (3)$$

and the coefficients are uniquely determined because p1 and p2 are independent non-zero vectors. In the example shown in FIG. 1A, a1 is positive and a2 is negative. The coefficients a1 and a2 are solutions of the equations $$a1x1+a2x2=xu, \quad (4)$$

$$a1y1+a2y2=yu, \quad (5)$$

which have the solutions $$a1=(xu\ y2-yu\ x2)/d12, \quad (6)$$

$$a2=(yu\ x1-xu\ y1)/d12, \quad (7)$$

$$d12=x1y2-x2y1. \quad (8)$$

The denominator D is non-zero because the locations with coordinates (x1,y1) and (x2,y2) and the origin (0,0) are non-collinear. The solutions a1 and a2 are linear combinations of the LDS-determined location coordinates xu and yu for the location of the user and depend upon combinations of the location coordinates (x1,y1) and (x2,y2) of the landmarks as determined in the LDS.

A function $F=f(w_1, w_2, \ldots, w_N)$ ($N \geq 2$) is a "linear combination" of the N variables or coordinates ($w_1, w_2, \ldots, w_N$) if this function can be expressed as a sum $$F=F_1w_1+F_2w_2+\ldots+F_N w_N+F_0, \quad (9)$$

where the coefficients $F_0, F_1, F_2, \ldots, F_N$ are constants independent of the values of any of the variables $w_1, \ldots, w_N$ and at least one of these constants $F_i$ ($i \neq 0$) is non-zero. The constant $F_0$ can be zero or non-zero.

Figure 2A:
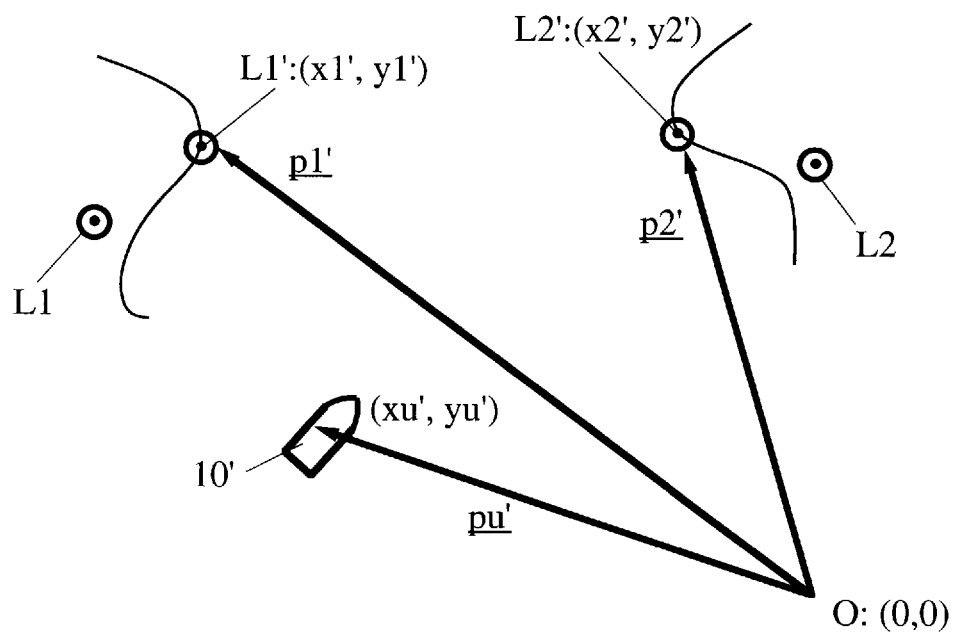
Figure 2B:
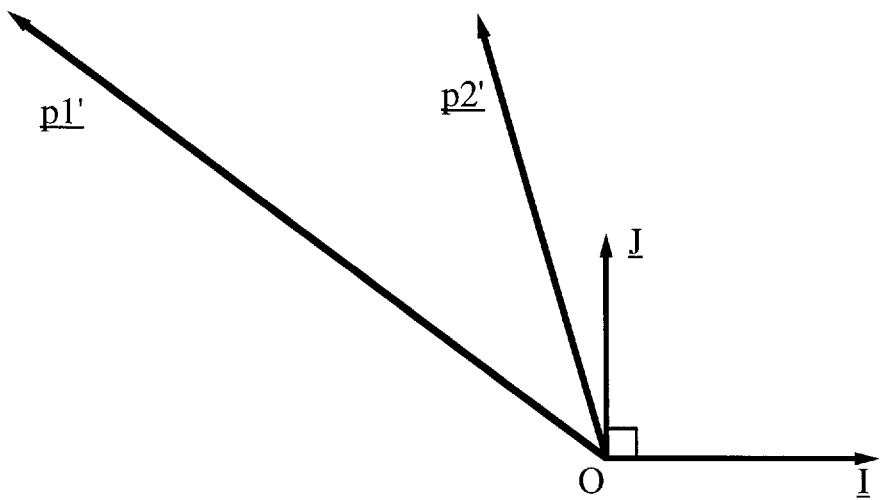

On the old map, shown in FIG. 2A, the locations of the same landmarks, denoted L1' and L2' on the old map, have the associated vectors $$p1'=x1'I+y1'J, \quad (10)$$

$$p2'=x2'I+y2'J, \quad (11)$$

extending from the corresponding origin O' on the old map to the locations of the respective landmarks L1' and L2'. FIG. 2B indicates the relationship of the vectors p1' and p2' to the fixed, orthogonal vectors I and J.

In a first embodiment of the invention in a two-dimensional space, an linear transformation is found that carries the location coordinate pairs (0,0), (x1,y1) and (x2,y2) into the corresponding pairs (0',0'), (x1',y1') and (x2',y2'). respectively. The linear transformation has four parameters a11, a12, a21, a22 and a center (x0,y0)=(0,0), and the defining equations become $$xi'=a11xi+a12yi (i=1,2), \quad (12)$$

$$yi'=a21xi+a22yi. \quad (13)$$

The coefficients aij are linear combinations of the old map landmark coordinates and are determined by the equations $$a11=(y2x1'-y1x2')/D12, \quad (14)$$

$$a12=(x1y2'-x2y1')/D12, \quad (15)$$

$$a21=(y2y1'-y1y2')/D12, \quad (16)$$

$$a22=(x1y2'-x2y1')/D12, \quad (17)$$

$$D12=x1y2-x2y1. \quad (18)$$

The origin is not collinear with the landmark locations L1 and L2 so that the denominator D12 is non-zero. The user location coordinates on the old map then become $$xu'=\{(y2x1'-y1x2')xu+(x1x2'-x2x1')yu\}/D12, \quad (19)$$

$$yu'=\{(y2y1'-y1y2')xu+(x1y2'-x2y1')yu\}/D12. \quad (20)$$

In a second embodiment of the invention in two dimensions, location coordinates on the old map are available for three landmarks L1', L2' and L3' that are non-collinear. In this situation, the origin in Table 1 plays no part. Here, a linear transformation, with an initially-unknown center having location coordinates (x0,y0), is found that carries the location coordinates pairs (x1,y1), (x2,y2), (x3,y3) into the corresponding pairs (x1',y1'), (x2',y2'), (x3',y3'), respectively. The defining equations become $$xi'-x0=a11(xi-x0)+a12(yi-y0) (i=1,2,3), \quad (21A)$$

$$yi'-y0=a21(xi-x0)+a22(yi-y0), \quad (22B)$$

or $$xi'=a11xi+a12yi-x01, \quad (21B)$$

$$yi'=a21xi+a22yi-x02, \quad (22B)$$

$$x01=(a11-1)x0+a12y0, \quad (23)$$

$$x02=a21x0+(a22-1)y0. \quad (24)$$

The six equations (21B) and (22B) contain six unknowns and can be manipulated to provide unique solutions for the six unknowns a11, a12, a21, a22, x0 and y0. Equation (21B) for i=3 is subtracted from Eq. (21B) for i=1 and is subtracted from Eq. (21B) for i=2 to provide two equations not involving x01. Equation (22B) for i=3 is subtracted from Eq. (22B) for i=1 and is subtracted from Eq. (22B) for i=2 to provide two equations not involving x02. The resulting four equations are $$a11(x1-x3)+a12(y1-y3)=x1'-x3', \quad (25)$$

$$a11(x2-x3)+a12(y2-y3)=x2'-x3', \quad (26)$$

$$a21(x1-x3)+a22(y1-y3)=y1'-y3', \quad (27)$$

$$a21(x2-x3)+a22(y2-y3)=y2'-y3'. \quad (28)$$

The last four equations provide solutions for four of the coefficients, viz., $$a11=\{(y2-y3)(x1'-x3')-(y1-y3)(x2'-x3')\}/\Delta 123, \quad (29)$$

$$a12=\{(x1-x3)(y2'-y3')-(x2-x3)(y1'-y3')\}/\Delta 123, \quad (30)$$

$$a21=\{(y2-y3)(y1'-y3')-(y1-y3)(y2'-y3')\}/\Delta 123, \quad (31)$$

$$a22=\{(x1-x3)(y2'-y3')-(x2-x3)(y1'-y3')\}/\Delta 123, \quad (32)$$

$$\Delta 123=(x1-x3)(y2-y3)-(x2-x3)(y1-y3). \quad (33)$$

These coefficient solutions are then inserted in Eqs. (21B) and (22B) for i=3 to provide the numerical values x01 and x02. Equations (23) and (24) are then manipulated to provide the remaining two unknown coefficients, viz., $$x0=\{(a22-1)x01-a12x02\}/A12, \quad (34)$$

$$y0=\{-a21x01+(a11-1)x02\}/A12, \quad (35)$$

$$A12=(a11-1)(a22-1)-a12a21. \quad (36)$$

By this procedure, all six parameters a11, a12, a21, a22, x0 and y0 in the linear transformation with a center (or translation) are determined. The user location coordinates on the old map in this second embodiment become $$xu'=a11xu+a12yu+x01, \quad (37)$$

$$yu'=a21xu+a22yu+x02. \quad (38)$$

The relations (19) and (20) (for use of two visible landmarks) or (37) and (38) (for use of three visible landmarks) can be applied to any other pair of LDS-determined location coordinates (x,y) to provide the corresponding pair of location coordinates (x',y') on the old map.

Assume that location coordinates for $N \geq 3$ physical landmarks are available on the old map and are available ab initio or are determinable from the user location in the LDS, and assume that all these coordinate pairs are to be used in determining or estimating the user location coordinates on the old map. In a third embodiment in two dimensions, the coordinate pairs (xi,yi) (i=1, 2, ..., N) are renumbered, if necessary, and divided into two mutually exclusive groups of adjacent locations G1 and G2, with each group having at least one such coordinate pair. Let the group G1 have the location coordinate pairs (x1j,y1j) (j=1, ..., N1), and let the group G2 have the location coordinate pairs (x2j,y2j)(j=N1+1, ..., N1+N2), with $N1 \geq 1$ and $N2 \geq 1$ and N1+N2=N. Choose a set of weight coefficients cj and a set of weight coefficients dj satisfying the constraints $$\sum_{j=1}^{N1} cj = \sum_{j=N1+1}^{N1+N2} dj = 1. \quad (39)$$

$$0 \leq cj \leq 1, \quad (40)$$

$$0 \leq dj \leq 1. \quad (41)$$

The weight coefficients cj are associated with the location coordinate pairs (xi,yi) assigned to the group G1, and the weight coefficients dj are associated with the location coordinate pairs (xi,yi) assigned to the group G2. The weight coefficients cj and dj could be chosen to be uniform, that is, $$cj=1/N1(j=1, \ldots, N1), \quad (42)$$

$$dj=1/N2(j=N1+1, \ldots, N1+N2). \quad (43)$$

Alternatively, the weight coefficients cj and/or dj could be chosen to decrease monotonically with the distance of the corresponding location in the group G1, with coordinate pair (xi,yi), from the user location, with coordinate pair (xu,yu). These choices may be stated mathematically as $$cj=F(\{(xj-xu)^2+(yj-yu)^2\}^{1/2})((xj,yj) \text{ in } G1), \quad (44)$$

$$dj=G(\{(xj-xu)^2+(yj-yu)^2\}^{1/2})((xj,yj) \text{ in } G2), \quad (45)$$

where F and G are selected non-negative, monotonically decreasing functions of their respective arguments. With this alternative choice, the values of the weight coefficients cj (and also dj) become smaller as the distance of the corresponding location from the user location increases. That is, the locations in the group G1 (and also in Group G2) that are closer to the user location are weighted more heavily than the locations in that group that are located further from the user location. In this alternative, the weighting coefficients must satisfy the constraints on the functions F and G in Eqs. (39), (44) and (45) but are otherwise arbitrary.

In this third embodiment in two dimensions, (fictitious) first and second landmark representative locations are defined by location coordinates (xr1,yr1) and (xr2,yr2) given by $$xr1 = \sum_{j=1}^{N1} cjxj, \quad (46)$$

$$yr1 = \sum_{j=1}^{N1} cjyj, \quad (47)$$

$$xr2 = \sum_{j=N1+1}^{N1+N2} djxj, \quad (48)$$

$$yr2 = \sum_{j=N1+1}^{N1+N2} djyj, \quad (49)$$

are introduced and used in place of the respective location coordinate pairs (x1,y1) and (x2,y2) in the preceding development accompanying Eqs. (12)–(20). In this third embodiment in two dimensions, the expressions for the user location coordinates on the old map become $$xu'=\{(yr2x1'-yr1x2')xu+(xr1x2'-xr2x1')yu]\}/Dr12, \quad (50)$$

$$yu'=\{(yr2y1'-yr1y2')xu+(xr1y2'-xr2y1')yu\}/Dr12. \quad (51)$$

$$Dr12=xr1yr2-xr2yr1. \quad (52)$$

Proceeding by analogy with the foregoing second embodiment, in a fourth embodiment in two dimensions, location coordinates for N landmarks ($N \geq 4$) are assumed to be available on the old map, and these N landmarks are assumed to be available for the user location in the LDS. The N locations are divided into a group G1 of N1 adjacent locations, a group G2 of N2 adjacent locations and a group G3 of N3 adjacent locations, with the three groups being mutually exclusive and N1+N2+N3=N. A weight coefficient cj, dk and em (j=1, ..., N1; k=N1+1, ..., N1+N2; m=N1+N2+1, ..., N) is assigned to each location coordinate pair (xi,yi) (i=1, 2, ..., N). The weight coefficients cj and/or dk and/or em may be uniform or may be chosen to be monotonically decreasing as the distance from the corresponding location to the LDS-defined user location increases, as in the third embodiment discussion. Three (fictitious) landmark representative location coordinate pairs (xri,yri) (i=1, 2, 3) are defined, namely, $$wr1 = \sum_{j=1}^{N1} cjwj \quad (w = x, y), \quad (53)$$

$$wr2 = \sum_{j=N1+1}^{N1+N2} djwj, \quad (54)$$

$$wr3 = \sum_{j=N1+N2+1}^{N1+N2+N3} ejwj. \quad (55)$$

The development of Eqs. (21A)–(38) in the second embodiment is applied, by analogy, to the equations $$xri'-x0=a11(xri-x0)+a12(yri-y0),(i=1,2,3) \quad (56)$$

$$yri'-y0=a21(xri-x0)+a22(yri-y0), \quad (57)$$

where representative coordinate pairs (xri',yri') (i=1,2,3) on the old map are defined by analogy to Eqs. (53)–(55). The analogous solutions for the user location coordinates on the old map become $$xu'=a11xu+a12yu+xr01, \quad (58)$$

$$yu'=a21xu+a22yu+xr02, \quad (59)$$

where the coefficients a11, a12, a21 and a22 are found by analogy with the development in the second embodiment and $$xr01=a11xr3+a12yr3-xr3', \quad (60)$$

$$xr02=a21xr3+a22yr3-yr3'. \quad (61)$$

The third and fourth embodiments in two dimensions extend the first two embodiments to $N \geq 3$ and to $N \geq 4$ landmarks, respectively. Each landmark representative can be a physical landmark.

In a fifth embodiment in two dimensions, one seeks as good a solution as possible to the simultaneous equations $$xi'=a11xi+a12yi, (i=1,2,\ldots,N) \quad (62)$$

$$yi'=a21xi+a22yi, \quad (63)$$

where $N \geq 3$. One forms an error term $$\epsilon(a11, a12, a21, a22) = \Sigma\epsilon xi(a11xi + a12yi - xi')^2 + \quad (64)$$
$$\Sigma\epsilon yi(a21xi + a22yi - yi')^2,$$

where each summation is over the index $i=1, 2, \ldots, N$ and each coefficient $\epsilon xi$ and each coefficient $\epsilon yi$ is real, non-negative and selected according to one or more chosen criteria. The error term $\epsilon$ is minimized with respect to the choices of each of the coefficients a11, a12, a21 and a22 by partially differentiating the error term $\epsilon$ in Eq. (64) with respect to each of these coefficients. This produces four simultaneous equations, viz.

$$\partial\epsilon/\partial a11=2(\epsilon xxxa11+\epsilon xxya12-\epsilon xxx')=0, \quad (65)$$

$$\partial\epsilon/\partial a12=2(\epsilon xxxa11+\epsilon xxya12-\epsilon xxx')=0, \quad (66)$$

$$\partial\epsilon/\partial a21=2(\epsilon xxxa21+\epsilon xxya22-\epsilon xxx')=0, \quad (67)$$

$$\partial\epsilon/\partial a22=2(\epsilon xxxa21+\epsilon xxya22-\epsilon xxx')=0, \quad (68)$$

$$\epsilon xxx=\Sigma\epsilon xi\ xi\ xi, \quad (69A)$$

$$\epsilon xxy=\Sigma\epsilon xi\ xi\ yi, \quad (69B)$$

$$\epsilon xyy=\Sigma\epsilon xi\ yi\ yi, \quad (69C)$$

$$\epsilon xxx'=\Sigma\epsilon xi\ xi\ xi', \quad (69D)$$

$$\epsilon xyx'=\Sigma\epsilon xi\ yi\ xi', \quad (69E)$$

$$\epsilon yxx=\Sigma\epsilon yi\ xi\ xi, \quad (69F)$$

$$\epsilon yxy=\Sigma\epsilon yi\ xi\ yi, \quad (69G)$$

$$\epsilon yyy=\Sigma\epsilon yi\ yi\ yi, \quad (69H)$$

$$\epsilon yxy'=\Sigma\epsilon yi\ xi\ yi', \quad (69I)$$

$$\epsilon yyy'=\Sigma\epsilon yi\ yi\ yi', \quad (69J)$$

Solutions of the four equations (65)–(68) are found, as in the preceding analyses, to be $$a11=(\epsilon xyy\ \epsilon xxx'-\epsilon xxy\ \epsilon xyx')/\Delta xxy, \quad (70)$$

$$a12=(\epsilon xxx\ \epsilon xyx'-\epsilon xxy\ \epsilon xxx')/\Delta xxy, \quad (71)$$

$$a21=(\epsilon yyy\ \epsilon yxy'-\epsilon yxy\ \epsilon yyy')/\Delta yxy, \quad (72)$$

$$a22=(\epsilon yxx\ \epsilon yyy'-\epsilon yxy\ \epsilon yxy')/\Delta yxy, \quad (73)$$

$$\Delta xxy=\epsilon xxx\ \epsilon xyx-(\epsilon xxy)^2, \quad (74)$$

$$\Delta yxy=\epsilon yxx\ \epsilon yyy-(\epsilon yxy)^2, \quad (75)$$

In this fifth embodiment, the user location coordinates on the old map are defined or estimated as $$xu'=a11xu+a12yu, \quad (76)$$

$$yu'=a21xu+a22yu, \quad (77)$$

In a sixth embodiment in two dimensions, one seeks as good a solution as possible to the simultaneous equations $$xi'-x0=a11(xi-x0)+a12(yi-y0), (i=1,2,\ldots,N) \quad (78)$$

$$yi'-y0=a21(xi-x0)+a22(yi-y0), \quad (79)$$

where $N \geq 4$ and the coordinate values x0 and y0 representing the "center" of the transformation are also unknown. One forms an error term $$\epsilon(a11, a12, a21, a22, x0, y0) = \quad (80)$$
$$\Sigma\epsilon xi\{a11(xi - x0) + a12(yi - y0) - xi' + x0\}^2/2 +$$
$$\Sigma\epsilon yi\{a21(xi - x0) + a22(yi - y0) - yi' + y0\}^2/2,$$

where each sum is over the index $i=1, 2, \ldots, N$ and the coefficients $\epsilon xi$ and $\epsilon yi$ are real, non-negative and selected according to one or more chosen criteria. One minimizes the error term $\epsilon$ with respect to the choices of each of the coefficients a11, a12, a21 and a22 by partially differentiating the error term $\epsilon$ in Eq. (80) with respect to each of the coefficients a11, a12, a21, a22, x0 and y0. This produces six simultaneous equations, viz.

$$\partial\epsilon/\partial a11=a11(\epsilon xxx-x0\epsilon xx)+a12(\epsilon xxy-y0\epsilon xx)-$$
$$(\epsilon xxx'-x0\epsilon xx)-x0A=0, \quad (81)$$

$$\partial\epsilon/\partial a12=a11(\epsilon xxy-x0\epsilon xy)+a12(\epsilon xyy-y0\epsilon xy)-$$
$$(\epsilon xyx'-x0\epsilon xy)-y0A=0, \quad (82)$$

$$\partial\epsilon/\partial x0=a11A+a21B=0, \quad (83)$$

$$\partial\epsilon/\partial a21=a21(\epsilon yxx-x0\epsilon yx)+a22(\epsilon yxy-y0\epsilon yx)-$$
$$(\epsilon yyx'-y0\epsilon yx)-x0B=0, \quad (84)$$

$$\partial\epsilon/\partial a22=a21(\epsilon yyx-x0\epsilon yy)+a22(\epsilon yyy-y0\epsilon yy)-$$
$$(\epsilon yyy'-y0\epsilon yy)-y0B=0, \quad (85)$$

$$\partial\epsilon/\partial y0=a12A+a22B=0, \quad (86)$$

$$A=a11(\epsilon xx-x0\epsilon x)+a12(\epsilon xy-y0\epsilon x)-(\epsilon xx'-x0\epsilon x), \quad (87)$$

$$B=a21(\epsilon yx-x0\epsilon y)+a22(\epsilon yy-y0\epsilon y)-(\epsilon yy'-y0\epsilon y), \quad (88)$$

$$\epsilon x=\Sigma\epsilon xi, \quad (89A)$$

$$\epsilon y=\Sigma\epsilon yi, \quad (89B)$$

$$\epsilon xx=\Sigma\epsilon xi\ xi, \quad (89C)$$

$$\epsilon xy=\Sigma\epsilon xi\ yi, \quad (89D)$$

$$\epsilon yx=\Sigma\epsilon yi\ xi, \quad (89E)$$

$$\epsilon yy=\Sigma\epsilon yi\ yi, \quad (89F)$$

$$\epsilon xxx=\Sigma\epsilon xi(xi)^2, \quad (89G)$$

$$\epsilon xxy=\Sigma\epsilon xi\ xi\ yi, \quad (89H)$$

$$\epsilon xyy=\Sigma\epsilon xi(yi)^2, \quad (89I)$$

$$\epsilon yxx=\Sigma\epsilon yi(xi)^2, \quad (89J)$$

$$\epsilon yxy=\Sigma\epsilon yi\ xi\ yi, \quad (89K)$$

$$\epsilon yyy=\Sigma\epsilon yi(yi)^2, \quad (89L)$$

$$\epsilon xx' = \Sigma \epsilon xi\ xi', \quad (89M)$$

$$\epsilon yy' = \Sigma \epsilon yi\ yi', \quad (89N)$$

$$\epsilon xxx' = \Sigma \epsilon xi\ xi\ xi', \quad (89O)$$

$$\epsilon yxx' = \Sigma \epsilon xi\ yi\ xi', \quad (89P)$$

$$\epsilon yyx' = \Sigma \epsilon yi\ yi\ xi', \quad (89Q)$$

$$\epsilon yyy' = \Sigma \epsilon yi\ yi\ yi', \quad (89R)$$

The error term $\epsilon$ defined in Eq. (80) is continuous, even differentiable, in each of the six coefficients a11, a12, a21, a22, x0 and y0. By allowing each of these six coefficients to ascend from $-\infty$ along the real line to $+\infty$, with the other five coefficients fixed at non-zero values, one verifies that the quantity $\epsilon$(a11, a12, a21, a22, x0, y0) attains a minimum value for each of these coefficients, with the others fixed. The error term $\epsilon$ attains an absolute minimum value for at least one choice of values for these six coefficients. Thus, Eqs. (81)–(86) have a common solution, although this solution may be hard to determine, and more than one set of values for these six coefficients may produce the same absolute minimum. A solution for Eqs. (81)–(86) may be estimated by use of non-linear programming techniques, such as a relative gradient approach. In such an approach, one of these six coefficients is allowed to vary, a local minimum is found, then another coefficient is allowed to vary and a second (lower) local minimum value is found. This process continues, with each of the six coefficients being allowed to vary in turn many times, and the sequence of local minima asymptotically approach the absolute minimum sought for $\epsilon$.

The absolute minimum solution for this sixth embodiment provides the location coordinates of the "center" (x0,y0) of the linear transformation and the transformation coordinates a11, a12, a21 and a22 that provides the "best possible" transformation (in the least squares sense) in carrying the LDS-determined landmark locations (xi,yi) into the landmark locations (xi',yi') on the old map. The user location coordinates (xu',yu') on the old map are then determined by the equations $$xu' = a11(xu-x0) + a12(yu-y0) + x0, \quad (90)$$

$$yu' = a21(xu-x0) + a22(yu-y0) + y0. \quad (91)$$

In a seventh embodiment of the invention in two dimensions, vectors pu, p1 and p2 are extended from the origin O to the user location, the landmark L1 location and the landmark L2 location, respectively, in the LDS, and the user location vector pu is expressed as a linear combination of the vectors p1 and p2 with selected coefficients a1 and a2, viz., $$pu = a1p1 + a2. \quad (92)$$

The coefficients a1 and a2 are uniquely determined because the vectors p1 and p2 are non-collinear and thus independent in this two-dimensional space. Vectors pu', p1' and p2' are extended from the origin O' to the user location, the landmark L1' location and the landmark L2' location, respectively, on the old map. The vectors p1' and p2' on the old map are then expressed as linear combinations of the vectors p1 and p2, viz., $$p1' = b11p1 + b12p2, \quad (93)$$

$$p2' = b21p1 + b22p2, \quad (94)$$

where the coefficients b11, b12, b21 and b22 are uniquely determined. The user location vector pu' on the old map is then determined by the relation $$\begin{aligned} \underline{pu'} &= a1\underline{p1'} + a2\underline{p2'} \\ &= (a1b11 + a2b21)\underline{p1} + (a1b12 + a2b22)\underline{p2}. \end{aligned} \quad (95)$$

The b-coefficients b11, b12, b21 and b22 will change as soon as one or more of the locations of the landmarks L1 and/or L2 changes. These b-coefficients define a linear transformation and are referenced to a set of independent vectors p1 and p2, but p1 and p2 are not fixed with respect to each other.

In an eighth embodiment of the invention in two dimensions, not implemented as a linear transformation, vectors pu, p1, p2, p3 are extended from the origin O to the user location, the landmark L1 location, the landmark L2 location and the landmark location L3, respectively, in the LDS. The LDS-determined user location vector pu is expressed as a convex linear combination of the vectors p1, p2 and p3 with coefficients a1 and a2, viz., $$pu = a1p1 + a2p2 + (1-a1-a2)p3. \quad (96)$$

The vectors p1, p2 and p3 are then expressed as convex linear combinations of the vectors p1', p2' and p3', viz., $$p1' = b11p1 + b12p2 + (1-b11-b12)p3. \quad (97)$$

$$p2' = b21p1 + b22p2 + (1-b21-b22)p3, \quad (98)$$

$$p3' = b31p1 + b32p2 + (1-b31-b32)p3, \quad (99)$$

where the coefficients b11, b12, b21, b22, b31 and b32 are uniquely determinable, using vector components referenced to a fixed orthogonal coordinate system or by some other approach. The vector X and one of the vectors p1 or p2 can be exchanged in Eqs. (96)–(99). The user location vector pu' on the old map is then expressed as $$\begin{aligned} \underline{pu'} &= a1\underline{p1'} + a2\underline{p2'} + (1-a1-a2)\underline{p3'} \\ &= (a1b11 + a2b21 + (1-a1-a2)b31)\underline{p1} + \\ &\quad (a1b12 + a2b22 + (1-a1-a2)b32)\underline{p2} + \\ &\quad \{a1(1-b11-b12) + a2(1-b21-b22) + \\ &\quad (1-a1-a2)(1-b31-b32)\}\underline{p3}. \end{aligned} \quad (100)$$

In a ninth embodiment of the invention, not involving a linear transformation, the LDS-determined user location vector pu is expressed as a convex linear combination of the vectors p1', p2' and p3' with coefficients a1', a2' and a3', $$pu = a1'p1' + a2'p2' + (1-a1'-a2')p3'. \quad (101)$$

The vectors p1, p2 and p3 are then expressed as particular linear combinations of the vectors p1', p2' and p3' on the map, viz., $$p1 = b11'p1' + b12'p2' + (1-b11'-b12')p3', \quad (102)$$

$$p2 = b21'p1' + b22'p2' + (1-b21'-b22')p3', \quad (103)$$

$$p3 = b31'p1' + b32'p2' + (1-b31'-b32')p3', \quad (104)$$

where the coefficients b11', b12', b21', b22', b31' and b32' are uniquely determinable, as before. The vector p3' and one of the vectors p1' or p2' can be exchanged in Eqs. (112), (113), (114) and (115). The user location vector pu' on the old map is then expressed as $$\begin{aligned}
\underline{pu}' &= a1'\underline{p1} + a2'\underline{p2} + (1-a1'-a2')\underline{p3} \\
&= (a1'b11' + a2'b21' + (1-a1'-a2')b31')\underline{p1}' + \\
&\quad (a1'b12' + a2'b22' + (1-a1'-a2')b32')\underline{p2}' + \\
&\quad \{a1'(1-b11'-b12') + a2'(1-b21'-b22') + \\
&\quad (1-a1'-a2')(1-b31'-b32')\}\underline{p3}'.
\end{aligned} \quad (105)$$

Figure 3:
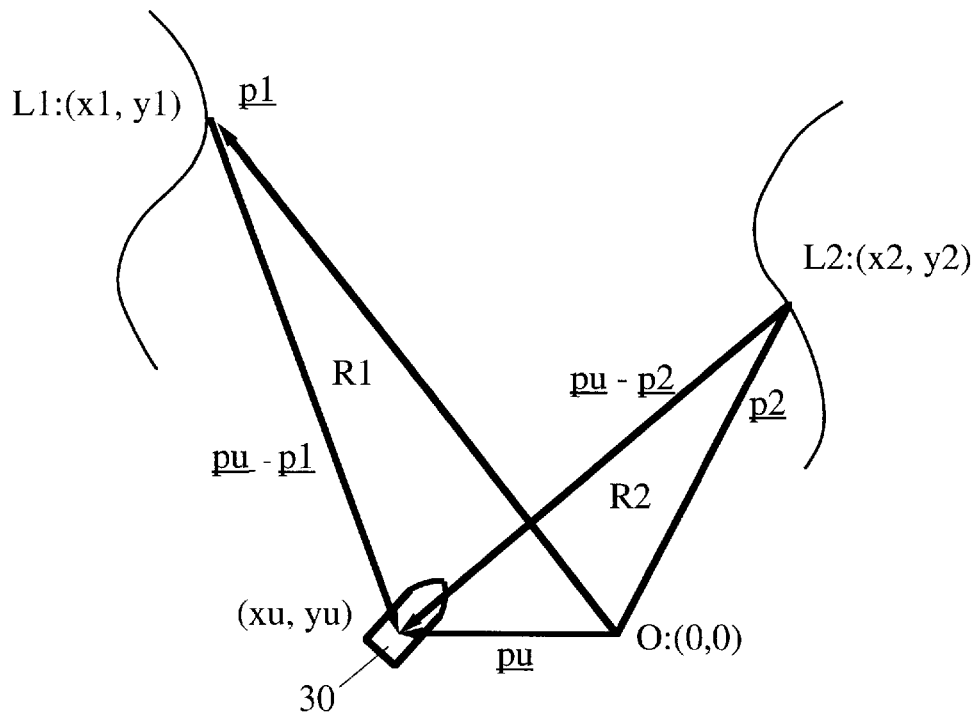
FIGS. 3 and 4 illustrate another embodiment of the invention, useful in a two-dimensional space.

A tenth embodiment of the invention in two dimensions works with ranges and landmark location coordinates. In FIG. 3, a user 30 determines ranges R1 and R2 from the user location to two visible landmarks, L1 and L2, with LDS-determined location coordinates (x1,y1) and (x2,y2). These ranges can be determined using the approach disclosed in the Gilbert et al patent application, op cit, or the approach disclosed in the Janky et al patent application, op cit, by using simple rangefinding techniques with conventional rangefinders, or by using known landmark coordinates.

Figure 4:
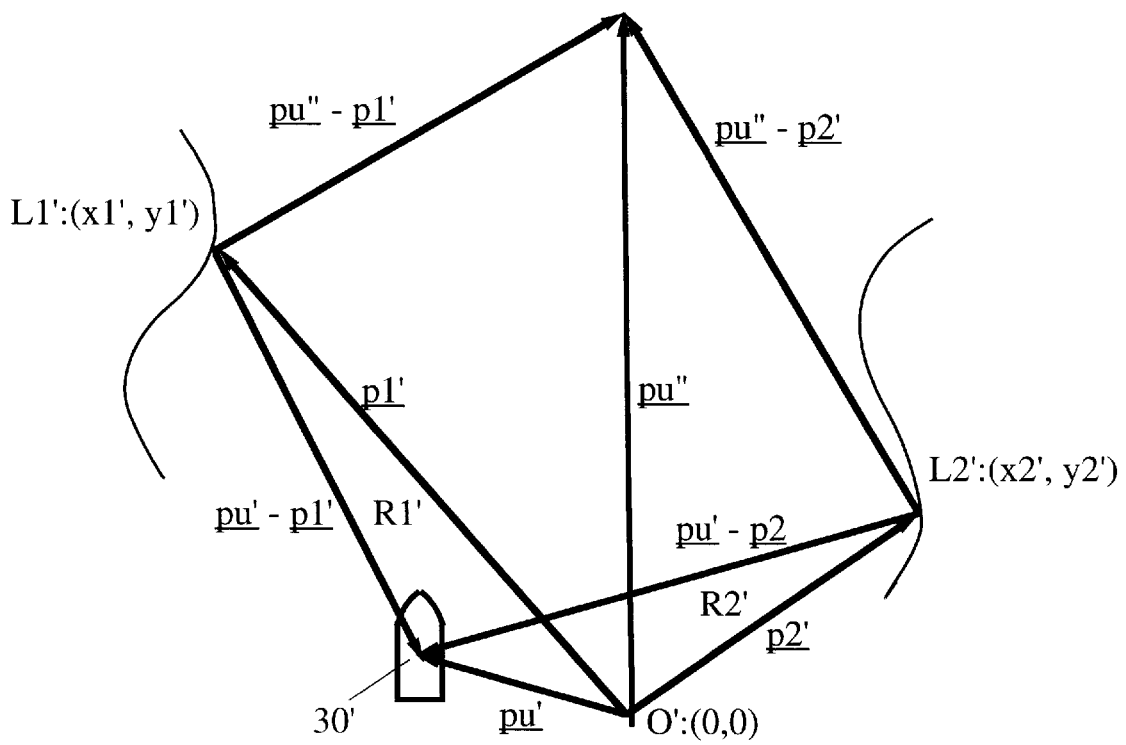

FIG. 4 shows the locations and location coordinates of the same landmarks, denoted L1' and L2', with location coordinates (x1',y1') and (x2',y2'), as shown on the old map. On the two-dimensional surface of the old map, at most two locations with corresponding vectors pu' and pu" exist, with corresponding location coordinates (xu',yu') and (xu",yu"), for which the distances from the user location 30' (given by pu' or pu") to the locations of the landmarks L1' and L2' are R1 and R2, respectively. One of these two locations can usually be rejected as unrealistic, based upon the spatial relationship of the user 30 to the locations of the landmarks L1 and L2, as determined by the LDS in FIG. 3.

For example, if the landmarks L1 and L2 in FIG. 3 both lie to the north (or both lie to the south) of the location of the user 30 according to the LDS, the two landmarks L1' and L2' in FIG. 4 should both lie to the north (or both lie to the south) of the location of the user 30' on the old map. If the LDS-determined location of the user 30 lies south of the location of the landmark L2 and lies north of the location of the landmark L1 in FIG. 3, this spatial relationship should be preserved for the location of the user 30' on the old map in FIG. 4. In a similar manner, the east-west spatial relationships of the LDS-determined locations of the landmarks L1 and L2 and the location of the user 30 in FIG. 3 should also be preserved by the relative locations of the location of the user 30' and the landmarks L1' and L2' on the old map in FIG. 4. These considerations would lead to rejection of the vector pu" as an estimated user location, for the configuration shown in FIG. 4.

The two candidate locations pu' and pu" for the user 40' in FIG. 4 will be symmetrically located relative to a line connecting the locations of the landmarks L1' and L2' on the old map. Thus, at least one of the candidate locations pu' and pu" can be eliminated, based upon preserving the north-south and/or east-west relationships of the user and the two landmarks on the old map. It is possible that neither of the candidate solutions (xu',yu') and (xu",yu") will preserve all the required north-south and east-west spatial relationships. In this situation, the locations of the two candidate solutions can be displayed graphically, and the candidate solution that best maintains these spatial relationships can be used.

The coordinates (xu',yu') and/or (xu",yu") of the estimated user location on the old map in FIG. 4 are determined as follows. The equations $$(x-x1')^2 + (y-y1')^2 = R1^2, \quad (106)$$

$$(x-x2')^2 + (y-y2')^2 = R2^2, \quad (107)$$

must be simultaneously satisfied for the estimated user location coordinates (x,y) on the old map. Subtraction of Eq. (107) from Eq. (106) yields a linear relationship between the unknowns x and y, namely $$x = a + b\,y, \quad (108)$$

$$a = \{R2^2 - R1^2 - x1'^2 + x2'^2 - y1'^2 + y2'^2\}/2(x1'-x2'), \quad (109)$$

$$b = -(y1'-y2')/(x1'-x2'), \quad (110)$$

assuming that x1'−x2'≠0. If x1'−x2'≠0, then y1'−y2'≠0, because the two landmarks are spaced apart; in this situation (x1'−x2'=0), the expressions involving xi' and the expressions involving yi', the constants R1 and R2, as well as the unknowns x and y, are simply interchanged in the following arguments. The linear relationship of Eq. (108) is then substituted into an equation produced by adding Eqs. (106) and (107) to produce a quadratic equation in the remaining unknown y, viz.

$$A\,y^2 + 2B\,y + C = 0, \quad (111)$$

$$A = 2(1+b^2), \quad (112)$$

$$B = 2a\,b - y1' - y2' - b(x1+x2) \quad (113)$$

$$C = x1'^2 + x2'^2 + y1'^2 + y2'^2 = 2a^2 - 2a(x1'+x2') - R1^2 - R2^2, \quad (114)$$

The quadratic equation (111) has two solutions, at least one of which is eliminated as discussed above to produce a set of location coordinates (x0',y0')=(x,y) for the location of the user 30' on the old map from Eqs. (108) and (111).

Succinctly stated, the user 30', with location coordinates (xu',yu') on the old map, is spaced apart from the locations of the landmarks L1' and L2' on the old map by the same respective distances R1 and R2 as the distances of the LDS-determined location of the user 30 from the LDS-determined locations of the landmarks L1 and L2. With reference to the notation used in the preceding embodiments, this embodiment locates the origin in the LDS coordinate system at the vessel location and requires the following vector magnitude equalities:

$$|p1-pu| = |p1'-pu'|, \quad (115)$$

$$|p2-pu| = |p2'-pu'|, \quad (116)$$

Table 2 presents the location coordinates, both known and unknown, for locations as determined by the LDS and the corresponding locations as shown on the old map, in three dimensions. Where only three visible landmarks L1', L2' and L3' with location coordinates (x1',y1,z1), (x2',y2',z2') and (x3',y3',z3') are shown on the old map, the corresponding LDS-determined location coordinates are (x1,y1,z1), (x2,y2,z2) and (x3,y3,z3), respectively. In this situation, the fourth landmark L4 in Table 2 plays no part. An origin O, with coordinates (0,0,0), and corresponding origin O' are chosen in the LDS and on the old map, respectively, and the LDS-determined location coordinates (xu,yu,zu) of the user are known. The origin O and the three landmark locations L1, L2 and L3 must not be coplanar in a three-dimensional space using the LDS (an "LDS map"). The corresponding user location coordinates (xu',yu',zu') on the old map are unknown and are to be determined.

TABLE 2

Corresponding Three-dimensional Location Coordinates

| Item | On LDS Map | On Old Map |
|---|---|---|
| Origin | (0,0,0) | (0,0,0) |
| Landmark L1 | (x1,y1,z1) | (x1',y1',z1') |
| Landmark L2 | (x2,y2,z2) | (x2',y2',z2') |
| Landmark L3 | (x3,y3,z3) | (x3',y3',z3') |
| Landmark L4 | (x4,y4,z4) | (x4',y4',z4') |
| User location | (xu,yu,zu) | (xu',yu',zu') |

In an first embodiment of the invention in a three-dimensional space, an linear transformation is found that carries the location coordinate triples (0,0,0), (x1,y1,z1), (x2,y2,z2) and (x3,y3,z3) into the corresponding triples (0,0), (x1',y1',z1'), (x2',y2',z2') and (x3',y3',z3'), respectively. The linear transformation has nine parameters aij (i=1,2,3; j=1,2,3), and the defining equations become $$xi' = a11xi + a12yi + a13zi, (i=1,2,3) \tag{117}$$

$$yi' = a21xi + a22yi + a23zi, \tag{118}$$

$$zi' = a31xi + a32yi + a33zi. \tag{119}$$

Let $Xi' = [xi'\ yi'\ zi']^{tr}$ and $Xi = [xi\ yi\ zi]^{tr}$ (i=1, 2, 3, 4, u, 0) denote the 3×1 column matrices containing the indicated entries, and let A, M(X1,2,3) and M(X'1,2,3) denote the respective 3×3 matrices $$A = \begin{bmatrix} a11 & a12 & a13 \\ a21 & a22 & a23 \\ a31 & a32 & a33 \end{bmatrix}, \tag{120}$$

$$M(X1,2,3) = \begin{bmatrix} x1 & x2 & x3 \\ y1 & y2 & y3 \\ z1 & z2 & z3 \end{bmatrix}, \tag{121}$$

$$M(X'1,2,3) = \begin{bmatrix} x1' & x2' & x3' \\ y1' & y2' & y3' \\ z1' & z2' & z3' \end{bmatrix}. \tag{122}$$

Equations (117)–(119) can then be written in the shorthand matrix notation $$Xi' = A\ Xi, (i=1,2,3) \tag{123}$$

and the unknown coefficients aij are determined by the matrix equations $$A = M(X'1,2,3) M(X1,2,3)^{-1} \tag{124}$$

The origin is not coplanar with the landmark locations L1, L2 and L3 so that the inverse matrix $M(X1,2,3)^{-1}$ exists. The user location coordinates on the old map are then defined by $$xu' = a11xu + a12yu + a13zu, \tag{125}$$

$$yu' = a21xu + a22yu + a23zu, \tag{126}$$

$$zu' = a31xu + a32yu + a33zu, \tag{127}$$

$$Xu' = A\ Xu. \tag{128}$$

In a second embodiment of the invention in three dimensions, location coordinates in the LDS and on the old map are available for four non-coplanar landmarks L1', L2', L3' and L4' from the user's location in a three-dimensional space. In this situation, the origin in Table 2 plays no part. Here, an linear transformation with parameters aij (i=1,2,3; j=1,2,3), with an initially-unknown center having location coordinates (x0,y0,z0), is found that carries the location coordinate triples (x1,y1,z1), (x2,y2,z2), (x3,y3,z3) and (x4,y4,z4) into the corresponding triples (x1',y1',z1'), (x2',y2',z2'), (x3',y3',z3') and (x4',y4',z4'), respectively. The defining equations become $$Xi' - X0 = A(Xi - X0)(i=1, 2, 3, 4). \tag{129}$$

$$Xi' = \begin{bmatrix} xi' \\ yi' \\ zi' \end{bmatrix}, \tag{130}$$

$$Xi = \begin{bmatrix} xi \\ yi \\ zi \end{bmatrix}. \tag{131}$$

By analogy with the development of Eqs. (21A)–(38), define $$X0 = \begin{bmatrix} x0 \\ y0 \\ z0 \end{bmatrix}, \tag{132}$$

$$A^* = \begin{bmatrix} a11-1 & a12 & a13 \\ a21 & a22-1 & a32 \\ a32 & a32 & a33-1 \end{bmatrix}. \tag{133}$$

$$X01 = A^* X0 = (A - I)X0. \tag{134}$$

Equations (129) then become $$Xi' = A\ Xi - X01 = A\ Xi - (A-I)X0. \tag{135}$$

Equation (135) with i=1 is subtracted from each of Eqs. (135) for i=2, 3 and 4 to produce three new matrix equations, viz., $$Xj' - X1' = A(Xj - X1)(j=2, 3, 4), \tag{136}$$

where the unknowns are again the entries of the matrix A. New matrices M(ΔX1,2,3,4) and M(ΔX'1,2,3,4) are introduced, defined by $$M(\Delta X1; 2, 3, 4) = \begin{bmatrix} x2-x1 & x3-x1 & x4-x1 \\ y2-y1 & y3-y1 & y4-y1 \\ z2-x1 & z3-y1 & z4-z1 \end{bmatrix}, \tag{137}$$

$$M(\Delta X'1; 2, 3, 4) = \begin{bmatrix} x2'-x1' & x3'-x1' & x4'-x1' \\ y2'-y1' & y3'-y1' & y4'-y1' \\ z2'-x1' & z3'-y1' & z4'-z1' \end{bmatrix}. \tag{138}$$

The solution of Eq. (136) can then be written as $$A = M(X';1,2,3) M(\Delta X'1;2,3,4)^{-1}. \tag{139}$$

The inverse matrix $M(X1;2,3,4)^{-1}$ exists because the four landmark locations are non-coplanar and, thus, the coordinates associated with the three vector differences X2−X1, X3−X1 and X4−X1 are non-collinear. The solution vector X0, which contains the location coordinates (x0,y0,z0) of the "center" of the linear transformation introduced in Eq. (129) is then found from Eq. (135), namely, $$X0 = (A^*)^{-1}(A\ X1 - X1'), \tag{140}$$

assuming that the inverse of the matrix A*=A−I exists. The user location coordinates on the old map then are then given by the components of the vector Xu' defined by $$Xu' = A\ Xu - (A-I)X0 = A\ Xu - (AX1 - X1'). \tag{141}$$

Assume that location coordinates for N≧4 pairs of distinct landmarks are available on the old map and are available/determinable from the user location in the LDS, and assume that all these coordinate triples are to be used in determining or estimating the user location coordinates on the old map. In a third embodiment in three dimensions, the coordinate triples (xi,yi,zi) (i=1, 2, ..., N) are divided into three mutually exclusive groups G1, G2 and G3 of coordinate triples for adjacent locations, with each group having at least one such triple. Let the group G1 have the location coordinate triples (x1j,y1j,z1j)(j=1, ..., N1), let the group G2 have the location coordinate triples (x2j,y2j,z2j)(j=N1+1, ..., N2), and let the third group G3 have the location coordinate triples (x3j,y3j,z3j)(j=N1+N2+1, ..., N) with N1≧1, N2≧1, N3≧1 and N1+N2+N3=N. Choose three set of weight coefficients {cj}, {dj} and {ej} satisfying the constraints $$\sum_{j=1}^{N1} cj = \sum_{j=N1+1}^{N1+N2} dj = \sum_{j=N1+N2+1}^{N1+N2+N3} ej = 1, \qquad (142)$$

$$0 \leq cj \leq 1, \qquad (143)$$

$$0 \leq dj \leq 1, \qquad (144)$$

$$0 \leq ej \leq 1. \qquad (145)$$

The weight coefficients cj, dj and ej are associated with the location coordinate triples (xi,yi,zi) assigned to the respective group G1, G2 and G3. The weight coefficients cj, dk and em could be chosen to be uniform, that is, $$cj=1/N1 (j=1, \ldots, N1), \qquad (146)$$

$$dj=1/N2 (j=N1+1, \ldots, N1+N2), \qquad (147)$$

$$ej=1/N3 (j=N1+N2+1, \ldots, N1+N2+N3), \qquad (148)$$

Alternatively, the weighting coefficients can be non-uniform, as discussed in connection with the third embodiment in two dimensions in connection with Eqs. (44)–(45).

First, second and third (fictitious) landmark representative locations, with location coordinates (xri,yri,zri) (i=1,2,3) given by $$wr1 = \sum_{j=1}^{N1} cjwj \quad (w=x,y,z), \qquad (149)$$

$$wr2 = \sum_{j=N1+1}^{N1+N2} djwj, \qquad (150)$$

$$wr3 = \sum_{j=N1+N2+1}^{N1+N2+N3} ejwj, \qquad (151)$$

are introduced and used in place of the respective location coordinate triples (x1,y1,z1), (x2,y2,z2) and (x3,y3,z3) in the preceding development accompanying Eqs. (117)–(128). In a third embodiment in three dimensions, the defining equations become, by analogy with this preceding development, $$Xri = [xri\ yri\ zri]^{tr} \quad (i=1,2,3), \qquad (152)$$

$$Xri' = [xri'\ yri'\ zri']^{tr}, \qquad (153)$$

$$Xri' = A Xri, \qquad (154)$$

$$M(X1,2,3) = \begin{bmatrix} xr1 & xr2 & xr3 \\ yr1 & yr2 & yr3 \\ zr1 & zr2 & zr3 \end{bmatrix}, \qquad (155)$$

$$M(X'1,2,3) = \begin{bmatrix} xr1' & xr2' & xr3' \\ yr1' & yr2' & yr3' \\ zr1' & zr2' & zr3' \end{bmatrix}, \qquad (156)$$

$$M(X'1,2,3)M(X1,2,3)^{-1}. \qquad (157)$$

The user location coordinates (xu',yu',zu') on the old map are found from $$Xu' = A\ Xu. \qquad (158)$$

Proceeding by analogy with the foregoing second embodiment, in a fourth embodiment in three dimensions, location coordinates for N landmarks (N≧4) are assumed to be available on the old map, and these N landmark coordinates are assumed to be available from the user location in the LDS. The N locations are divided, as in the third embodiment, into a group G1 of N1 adjacent locations, a group G2 of N2 adjacent locations, a group G3 of N3 adjacent locations and a group G4 of N4 locations, with the four groups being mutually exclusive and N1+N2+N3+N4=N. A weight coefficient cj, dk, em or fn (j=1, ..., N1; k=N1+1, ..., N1+N2; m=N1+N2+1, ..., N1+N2+N3; n=N1+N2+N3+1, ..., N) is assigned to each location coordinate triple (xi,yi,zi) (i=1, 2, ..., N). The weighting coefficients cj and/or dk and/or em and/or fn may be uniform or may be chosen to be non-uniform, as discussed above. Four (fictitious) landmark representative location coordinate triples (xri,yri,zri) (i=1, 2, 3, 4) are defined, namely, $$wr1 = \sum_{j=1}^{N1} cjwj, \quad (w=x,y,z) \qquad (159)$$

$$wr2 = \sum_{j=N1+1}^{N1+N2} djwj, \qquad (160)$$

$$wr3 = \sum_{j=N1+N2+1}^{N1+N2+N3} ejwj, \qquad (161)$$

$$wr4 = \sum_{j=N1+N2+N3+1}^{N1+N2+N3+N4} fjwj, \qquad (162)$$

The analog of Eqs. (129)–(141) is applied here to produce the equations $$Xri' - X0 = A(Xri - X0) \quad (i=1,2,3,4). \qquad (163)$$

$$X0 = \begin{bmatrix} x0 \\ y0 \\ z0 \end{bmatrix}, \qquad (164)$$

$$A^* = \begin{bmatrix} a11-1 & a12 & a13 \\ a21 & a22-1 & a32 \\ a32 & a32 & a33-1 \end{bmatrix}. \qquad (165)$$

$$X01 = A^*X0 = (A-I)X0. \qquad (166)$$

$$Xri' = AXri - X01 = AXri - (A-I)X0, \qquad (167)$$

$$Xj' - X1' = A(Xj - X1) \quad (j=2,3,4), \qquad (168)$$

$$M(\Delta Xr1;2,3,4) = \begin{bmatrix} xr2-xr1 & xr3-xr1 & xr4-xr1 \\ yr2-yr1 & yr3-yr1 & yr4-yr1 \\ zr2-xr1 & zr3-yr1 & zr4-zr1 \end{bmatrix}, \qquad (169)$$

$$M(\Delta Xr'1;2,3,4) = \begin{bmatrix} xr2'-xr1' & xr3'-xr1' & xr4'-xr1' \\ yr2'-yr1' & yr3'-yr1' & yr4'-yr1' \\ zr2'-xr1' & zr3'-yr1' & zr4'-zr1' \end{bmatrix}, \qquad (170)$$

-continued $$A = M(\Delta Xr1'; 2, 3, 4)M(\Delta Xr1; 2, 3, 4)^{-1}. \tag{171}$$

$$X0 = (A^*)^{-1}(AXr1 - Xr1'). \tag{172}$$

The user location coordinates on the old map then are then given by the components of the vector $Xu'$ defined by $$Xu' = A\,Xu - (A-I)X0 = A\,Xu - (A\,Xr1 - Xr1'). \tag{173}$$

In a fifth embodiment in three dimensions, one seeks as good a solution as possible to the simultaneous equations $$xi' = a11xi + a12yi + a13zi, (i=1,2,\ldots,N) \tag{174}$$

$$yi' = a21xi + a22yi + a23zi, \tag{175}$$

$$zi' = a31xi + a32yi + a33zi, \tag{176}$$

where $N \geq 4$. One forms an error term $$\epsilon(a11, a12, a13, a21, a22, a23, a31, a32, a33) = \tag{177}$$
$$\Sigma \epsilon xi(a11xi + a12yi + a13zi - xi')^2/2 +$$
$$\Sigma \epsilon yi(a21xi + a22yi + a23zi - yi')^2/2 +$$
$$\Sigma \epsilon zi(a31xi + a32yi + a33zi - zi')^2/2,$$

where each summation is over the index $i=1, 2, \ldots, N$ and each coefficient $\epsilon xi$, $\epsilon yi$ and $\epsilon zi$ is real, non-negative and selected according to one or more chosen criteria. One minimizes the error term $\epsilon$ with respect to the choices of each of the coefficients $aij$ ($i,j=1,2,3$) by partially differentiating the error term $\epsilon$ in Eq. (177) with respect to each of the coefficients $aij$. This produces nine simultaneous equations, viz.

$$\partial \epsilon/\partial a11 = \epsilon xxx\,a11 + \epsilon xxy\,a12 + \epsilon xxz\,a13 - \epsilon xxx' = 0, \tag{178}$$

$$\partial \epsilon/\partial a12 = \epsilon xxy\,a11 + \epsilon xyy\,a12 + \epsilon xyz\,a13 - \epsilon xyx' = 0, \tag{179}$$

$$\partial \epsilon/\partial a13 = \epsilon xxz\,a11 + \epsilon xyz\,a12 + \epsilon xzz\,a13 - \epsilon xzx' = 0, \tag{180}$$

$$\partial \epsilon/\partial a21 = \epsilon yxx\,a21 + \epsilon yxy\,a22 + \epsilon yxz\,a23 - \epsilon yxy' = 0, \tag{181}$$

$$\partial \epsilon/\partial a22 = \epsilon yxy\,a21 + \epsilon yyy\,a22 + \epsilon yyz\,a23 - \epsilon yyy' = 0, \tag{182}$$

$$\partial \epsilon/\partial a23 = \epsilon yxz\,a21 + \epsilon yyz\,a22 + \epsilon yzz\,a23 - \epsilon yzy' = 0, \tag{183}$$

$$\partial \epsilon/\partial a31 = \epsilon zxx\,a31 + \epsilon zxy\,a32 + \epsilon zxz\,a33 - \epsilon zxz' = 0, \tag{184}$$

$$\partial \epsilon/\partial a32 = \epsilon zxy\,a31 + \epsilon zyy\,a32 + \epsilon zyz\,a33 - \epsilon zyz' = 0, \tag{185}$$

$$\partial \epsilon/\partial a33 = \epsilon zxz\,a31 + \epsilon zyz\,a32 + \epsilon zzz\,a33 - \epsilon zzz' = 0, \tag{186}$$

$$\epsilon xxx = \Sigma \epsilon xi\,xi\,xi, \tag{187A}$$

$$\epsilon xxy = \Sigma \epsilon xi\,xi\,yi, \tag{187B}$$

$$\epsilon xxz = \Sigma \epsilon xi\,xi\,zi, \tag{187C}$$

$$\epsilon xyy = \Sigma \epsilon xi\,yi\,yi, \tag{187D}$$

$$\epsilon xyz = \Sigma \epsilon xi\,yi\,zi, \tag{187E}$$

$$\epsilon xzz = \Sigma \epsilon xi\,zi\,zi, \tag{187F}$$

$$\epsilon yxx = \Sigma \epsilon yi\,xi\,xi, \tag{187G}$$

$$\epsilon yxy = \Sigma \epsilon yi\,xi\,yi, \tag{187H}$$

$$\epsilon yxz = \Sigma \epsilon yi\,xi\,zi, \tag{187I}$$

$$\epsilon yyy = \Sigma \epsilon yi\,yi\,yi, \tag{187J}$$

$$\epsilon yyz = \Sigma \epsilon yi\,yi\,zi, \tag{187K}$$

$$\epsilon yzz = \Sigma \epsilon yi\,zi\,zi, \tag{187L}$$

$$\epsilon zxx = \Sigma \epsilon zi\,xi\,xi, \tag{187M}$$

$$\epsilon zxy = \Sigma \epsilon zi\,xi\,yi, \tag{187N}$$

$$\epsilon zxz = \Sigma \epsilon zi\,xi\,zi, \tag{187O}$$

$$\epsilon zyy = \Sigma \epsilon zi\,yi\,yi, \tag{187P}$$

$$\epsilon zyz = \Sigma \epsilon zi\,yi\,zi, \tag{187Q}$$

$$\epsilon zzz = \Sigma \epsilon zi\,zi\,zi, \tag{187R}$$

$$\epsilon xxx' = \Sigma \epsilon xi\,xi\,xi', \tag{187S}$$

$$\epsilon xyx' = \Sigma \epsilon xi\,yi\,xi', \tag{187T}$$

$$\epsilon xzx' = \Sigma \epsilon xi\,zi\,xi', \tag{187U}$$

$$\epsilon yxy' = \Sigma \epsilon yi\,xi\,yi', \tag{187V}$$

$$\epsilon yyy' = \Sigma \epsilon yi\,yi\,yi', \tag{187W}$$

$$\epsilon yzy' = \Sigma \epsilon yi\,zi\,yi', \tag{187X}$$

$$\epsilon zxz' = \Sigma \epsilon zi\,xi\,zi', \tag{187Y}$$

$$\epsilon zyz' = \Sigma \epsilon zi\,yi\,zi', \tag{187Z}$$

$$\epsilon zzz' = \Sigma \epsilon zi\,zi\,zi', \tag{187AA}$$

The matrices $$Ew = \begin{bmatrix} \epsilon wxx & \epsilon wxy & \epsilon wxz \\ \epsilon wxy & \epsilon wyy & \epsilon wyz \\ \epsilon wxz & \epsilon wyz & \epsilon wzz \end{bmatrix}, (w = x, y, z) \tag{188}$$

$$Ew' = \begin{bmatrix} \epsilon wxw' \\ \epsilon wyw' \\ \epsilon wzw' \end{bmatrix}, (w = x, y, z) \tag{189}$$

$$Aq = \begin{bmatrix} aq1 \\ aq2 \\ aq3 \end{bmatrix}, (q = 1, 2, 3) \tag{190}$$

and Eqs. (178)–(186) are rewritten as $$Ex\,A1 = Ex', \tag{191}$$

$$Ey\,A2 = E2', \tag{192}$$

$$Ez\,A3 = Ez'. \tag{193}$$

The solutions for the unknown parameters $aij$ ($i,j=1,2,3$) become $$A1 = (Ex)^{-1}Ex', \tag{194}$$

$$A2 = (Ey)^{-1}Ey', \tag{195}$$

$$A3 = (Ez)^{-1}Ez'. \tag{196}$$

With the parameters $aij$ in hand, the user location coordinates on the old map become $$xu' = a11xu + a12yu + a13zu, \tag{197}$$

$$yu' = a21xu + a22yu + a23zu, \tag{198}$$

$$zu' = a31xu + a32yu + a33zu, \tag{199}$$

In a sixth embodiment of the invention in three dimensions, vectors pu, p1, p2 and p3 are extended from the origin O to the user location, the landmark L1 location, the landmark L2 location and the landmark L3 location, respectively, in the LDS, and the user location vector pu is expressed as a linear combination of the vectors p1, p2 and p3 with coefficients a1, a2 and a3, viz., $$pu = a1p1 + a2p2 + a3p3. \quad (200)$$

The coefficients a1, a2 and a3 are uniquely determined because the location of the origin and endpoint locations of the vectors p1, p2 and p3 are non-coplanar, and the vectors p1, p2 and p3 are thus independent in this three-dimensional space. Vectors pu', p1', p2' and p3' are extended from the origin O' to the user location, the landmark L1' location, the landmark L2' location and the landmark L3' location, respectively, on the old map. The vectors p1', p2' and p3' on the old map are then expressed as linear combinations of the vectors p1, p2 and p3, viz., $$p1' = b11 p1 + b12 p2 + b13 p3, \quad (201)$$

$$p2' = b21 p1 + b22 p2 + b23 p3, \quad (202)$$

$$p3' = b31 p1 + b32 p2 + b33 p3, \quad (203)$$

where the uniquely determined coefficients bij define a linear transform. The user location vector on the old map is then determined by the relation $$\underline{pu'} = a1\underline{p1'} + a2\underline{p2'} + a3\underline{p3'} = \quad (204)$$

$$(a1b11 + a2b21 + a3b31)\underline{p1} + (a1b12 + a2b22 + a3b23)\underline{p2} +$$

$$(a1b13 + a2b23 + a3b33)\underline{p3}.$$

The b-coefficients bij will change as soon as one or more of the locations of the landmarks L1 and/or L2 and/or L3 changes. These b-coefficients are referenced to a set of independent vectors p1, p2 and p3, but p1, p2 and p3 are not fixed with respect to each other.

In a seventh embodiment of the invention in three dimensions, not a linear transform, vectors pu, p1, p2, p3 and p4 are extended from the origin O to the user location, the landmark L1 location, the landmark L2 location, the landmark location L3 and the landmark L4 location, respectively, in the LDS. The LDS-determined user location vector pu is expressed as a convex linear combination of the vectors p1, p2, p3 and p4 with coefficients a1, a2, a3 and a4, viz., $$pu = a1p1 + a2p2. + a3p3 + (1-a1-a2-a3)p4. \quad (205)$$

The vectors p1', p2', p3' and p4' are then expressed as convex linear combinations of the vectors p1, p2, p3 and p4 on the map, viz., $$p1' = b11p1 + b12p2 + b13p3 + (1-b11-b12-b13)p4, \quad (206)$$

$$p2' = b21p1 + b22p2 + b23p3 + (1-b21-b22-b23)p4, \quad (207)$$

$$p3' = b31p1 + b32p2 + b33p3 + (1-b31-b32-b33)p4, \quad (208)$$

$$p4' = b41p1 + b42p2 + b43p3 + (1-b41-b42-b43)p4, \quad (209)$$

where the coefficients bij' are uniquely determinable, using vector components referenced to a fixed orthogonal coordinate system or by some other approach. The vector p4 and one of the vectors p1 or p2 or p3 can be exchanged in Eqs. (205)–(209). By analogy with Eq. (95), the user location vector pu' on the old map is then expressed as $$\underline{pu'} = (a1b11 + a2b21 + a3b31 + \quad (210)$$

$$(1 - a1 - a2 - a3)b41)\underline{p1} + (a1b12 + a2b22 + a3b32 +$$

$$(1 - a1 - a2 - a3)b42)\underline{p2} + (a1b13 + a2b23 + a3b33 +$$

$$(1 - a1 - a2 - a3)\underline{p3} + \{a1(1 - b11 - b12 - b13) +$$

$$a2(1 - b21 - b22 - b23) + a3(1 - b31 - b32 - b33) +$$

$$(1 - a1 - a2 - a3)(1 - b41 - b42 - b43)\underline{p4}.$$

In an eighth embodiment of the invention in three dimensions, also not a linear transform, the LDS-determined user location vector pu is expressed as a convex linear combination of the vectors p1', p2', p3' and p4' with coefficients a1', a2', a3' and a4', viz., $$pu = a1'p1' + a2'p2' + a3'p3' + (1-a1'-a2'-a3')p4'. \quad (211)$$

The vectors p1, p2, p3 and p4 are then expressed as particular linear combinations of the vectors p1', p2', p3' and p4', viz.

$$p1 = b11p1' + b12p2' + b13p3' + (1-b11-b12-b13)p4', \quad (212)$$

$$p2 = b21p1' + b22p2' + b23p3' + (1-b21-b22-b23)p4', \quad (213)$$

$$p3 = b31p1' + b32p2' + b33p3' + (1-b31-b32-b33)p4', \quad (214)$$

$$p4 = b41p1' + b42p2' + b43p3' + (1-b41-b42-b43)p4', \quad (215)$$

where the coefficients bij are uniquely determinable, as before. The vector p4' and one of the vectors p1' or p2' or p3' can be exchanged in Eqs. (211)–(215). By analogy with Eq. (100), the user location pu' on the old map is then expressed as $$\underline{pu'} = (a1'b11 + a2'b21 + a3'b31 + (1 - a1' - a2' - a3')b41)\underline{p1'} + \quad (216)$$

$$(a1'b12 + a2'b22 + a3'b32 + (1 - a1' - a2' - a3')b42)\underline{p2'} +$$

$$(a1'b13 + a2'b23 + a3'b33 + (1 - a1' - a2' - a3')b43)\underline{p3'} +$$

$$[a1'(1 - b11 - b12 - b13) + a2'(1 - b21 - b22 - b23) +$$

$$a3'(1 - b31 - b32 - b33) +$$

$$(1 - a1' - a2' - a3')(1 - b41 - b42 - b43)]\underline{p4'}.$$

In a ninth embodiment of the invention in three dimensions, range as well as location coordinates are used to determine the location coordinates of a user 50 on the old map, proceeding by analogy with development of the tenth embodiment in two dimensions.

Figure 5:
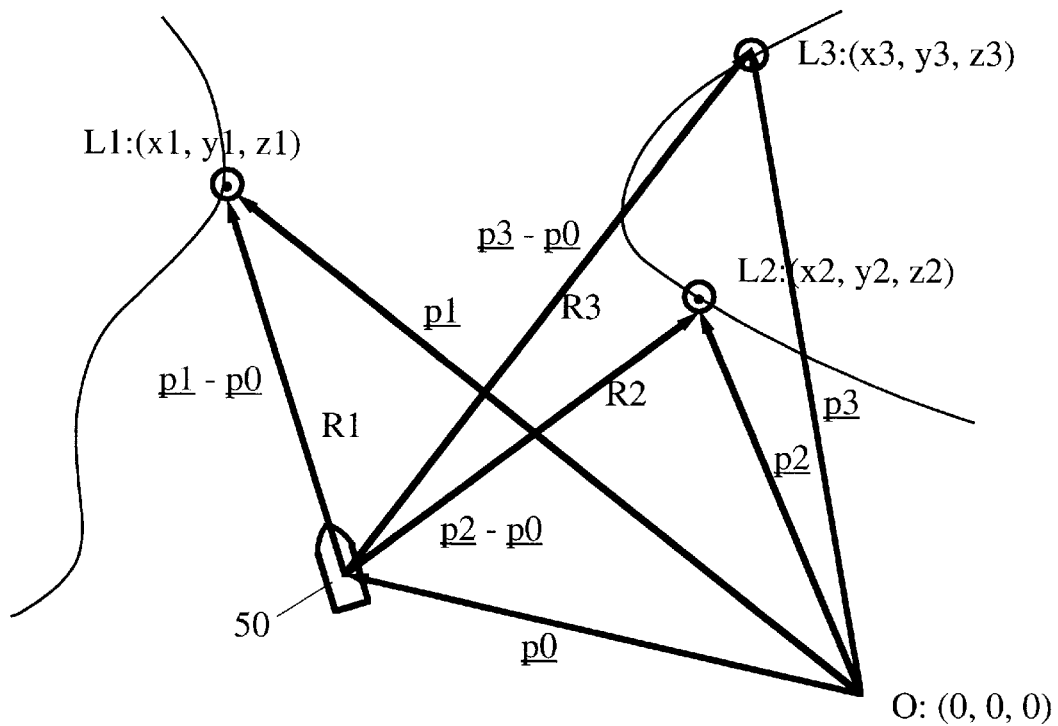
FIGS. 5 and 6 illustrate another embodiment of the invention, useful in a three-dimensional space.
Figure 6:
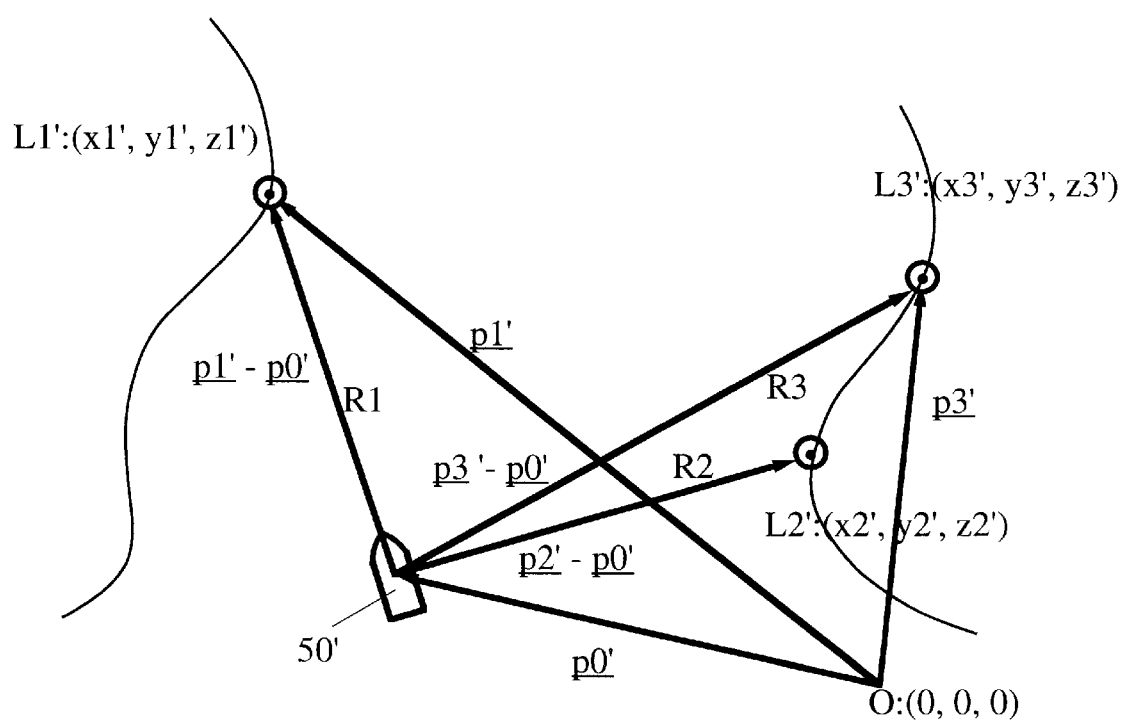

FIG. 5 is a projection of a three-dimensional region on a two-dimensional surface showing the projected locations of three landmarks, L1, L2 and L3, that are also shown on an old map as L1', L2' and L3' in FIG. 5, with the respective location coordinates (x1',y1',z1'), (x2',y2',z2') and (x3',y3',z3'). The origin O' and the three landmarks L1', L2' and L3' on the old map are assumed to be non-coplanar. The LDS-determined location coordinates of the user 50 and landmarks L1, L2 and L3 in FIG. 5 are known or determinable. The distances or ranges R1, R2 and R3 from the user 50 to the respective landmarks L1, L2 and L3 are therefore known. Estimated location coordinates (xu',yu',zu') of the user 50' in FIG. 6 are sought that preserve these distances.

Two candidate locations, pu' and pu", are found that are symmetrically located relative to a plane that contains the locations for the landmarks L1', L2' and L3'. The defining equations are analogs of Eqs. (106) and (107), viz.

$$(xu'-x1')^2 + (yu'-y1')^2 + (zu'z1')^2 = R1^2, \quad (217)$$

$$(xu'-x2')^2+(yu'-y2')^2+(zu'z2')^2=R2^2, \quad (218)$$

$$(xu'-x3')^2+(yu'-y3')^2+(zu'z3')^2=R3^2, \quad (219)$$

Equation (219) is subtracted from each of Eqs. (217) and (218) to produce two linear relations $$xu'(x1'-x3')+yu'(y1'-y3')+zu'(z1'-z3')-D=0, \quad (220)$$

$$xu'(x2'-x3')+yu'(y2'-y3')+zu'(z2'-z3')-E=0, \quad (221)$$

$$2E=R3^2-R1^2+x1'^2-x3'^2+y1'^2-y3'^2+z1'^2-z3'^2, \quad (222)$$

$$2F=R3^2-R2^2+x2'^2-x3'^2+y2'^2-y3'^2+z2'^2-z3'^2, \quad (223)$$

The non-equality $$d=(y1'-y3')(x2'-x3')-(y2'-y3')(x1'-x3')\neq 0 \quad (224)$$

is valid, because the origin and the three landmarks L1', L2' and L3' are non-co-planar on the old map. Equations (220) and (221) are rearranged to express the unknowns x and y in terms of the unknown z, viz., $$xu'=e\,z+f, \quad (225)$$

$$yu'=g\,z+h, \quad (226)$$

$$e=[(z1'-z3')(y2'-y3')-(z2'-z3')(y1'-y3')]/d, \quad (227)$$

$$f=[(y1'-y3')E-(y2'-y3')D]/d \quad (228)$$

$$g=[(z2'-z3')(x1'-x3')-(z1'-z3')(x2'-x3')]/d, \quad (229)$$

$$h=[(x2'-x3')D-(x1'-x3')E]/d. \quad (230)$$

The three Eqs. (217), (218) and (219) are then added together and Equations (220) and (221) are used to produce a quadratic equation in a single unknown Z, viz.

$$Fzu'^2 + 2Gzu' + H = 0, \quad (231)$$

$$F = 3(1 + e^2 + g^2), \quad (232)$$

$$G = 3ef + 3gh - 2f(x1' + x2' + x3') - 2h(y1' + y2' + y3') - \quad (233)$$
$$2(z1' + z2' + z3'),$$

$$H = 3f^2 + 3h^2 - 2f(x1' + x2' + x3') - 2h(y1' + y2' + y3') + \quad (234)$$
$$x1'^2 + x2'^2 + x3'^2 + y1'^2 + y2'^2 + y3'^2 + z1'^2 + z2'^2 + z3'^2 -$$
$$(R1^2 + R2^2 + R3^2).$$

The quadratic equation (231) provides two solutions with corresponding three-dimensional vectors pu' and pu", at least one of which can be discarded based upon maintaining the same north-south, east-west and/or up-down spatial relationships of the user 50"with the landmarks L1', L2' and L3' on the old map as are present for the LDS-determined location of the user 50 relative to the locations of the landmarks L1, L2 and L3. With reference to the notation used in the preceding three-dimensional embodiments, this embodiment locates the origin in the LDS coordinate system at the user location and requires the following constraints concerning the vector lengths:

$$|p1-pu|=|p1'-pu'|, \quad (235)$$

$$|p2-pu|=|p2'-pu'|, \quad (236)$$

$$|p3-pu|=|p3'-pu'|, \quad (237)$$

Any of the embodiments disclosed here can be implemented, using a computer with an LDS-determined electronic map and using an old map containing location coordinates in a suitable coordinate system. The invention allows use of a physical old map, appearing on a suitable substrate, or of an electronic version of the old map contained in a computer. The user can be a person, a land vehicle, a marine or airborne vessel, or any other suitable object.

The computer can analyze the LDS-determined configuration of the user location relative to the two, three, four or more visible landmarks and, using the location coordinates for these landmarks given on the old map, provide the location coordinates (xu',yu',zu') (or (xu',yu')) or the vector pu' or p" or pU"" of the user location on the old map. Only the last step, that of marking the location coordinates (xu', yu',zu') for the user location on the old map, may need to be done manually, if a physical old map is used. Alternatively, the old map features can be entered as another electronic map for purposes of analysis and display of the estimated user location on the old map.

Two or more different determinations of the user location vector on the old map, pu'(1) and pu'(2) and pu'(3), or the corresponding location coordinates, can be combined in a convex linear combination to form a new user location vector on the old map, for example, $$pu''''=c1pu'(1)+c2pu'(2)+(1-c1-c2)pu'(3)., \quad (238)$$

where c1 and c2 are selected real numbers, preferably satisfying the constraints $0 \leq c1 \leq 1$, $0 \leq c2 \leq 1$, $0 \leq c1+c2 \leq 1$. One of these location vectors pu'(i)(i=1,2,3) may be chosen to be the user location vector pu found in the LDS. For convenient reference in the following discussion, the user location vector pu"" will refer to a convex linear combination, such as shown in Eq. (238), or to an individually determined vector pu' as determined in one of the foregoing embodiments.

Figure 7:
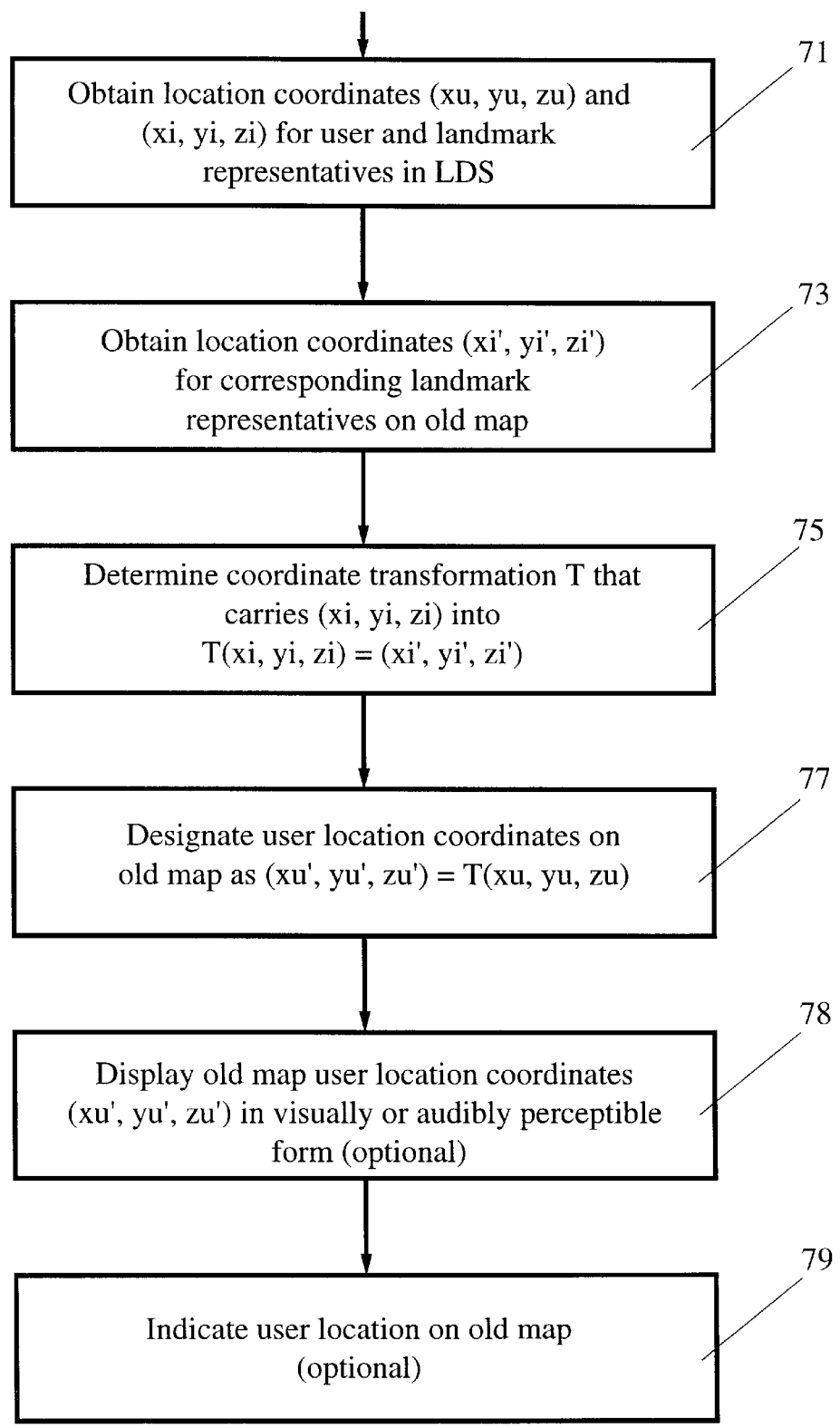
FIGS. 7 and 8 are flow diagrams for practicing the invention.

FIG. 7 is a flow diagram illustrating suitable procedures for practice of embodiments 1–9 for the invention in two dimensions or of embodiments 1–8 for the invention in three dimensions. In step 71, LDS-determined location coordinates for the user and the landmark representatives to be used are obtained, either by direct observation or from coordinates available ab initio. In step 73, the location coordinates for the corresponding landmark representatives shown on the old map are obtained. In step 75, a coordinate transformation T is found that carries the location coordinates for each landmark representative in the LDS onto the location coordinates for the corresponding landmark representative on the old map. In step 77, the transformation T is applied to the LDS-determined user location coordinates to determine the user location coordinates on the old map. The location coordinates for a landmark representative may be (1) the location coordinates for a single physical landmark or (2) a convex linear combination of the landmark coordinates for two or more physical landmarks, as developed in Eqs. (46)–(52) or in Eqs. (53)–(61). Optionally, the user location coordinates on the old map found in the procedure in FIG. 7 can be displayed in visually perceptible form, or in audibly perceptible form by an aural announcement, in step 78. Optionally, the estimated user location on the old map can be indicated on the old map, in step 79.

Figure 8:
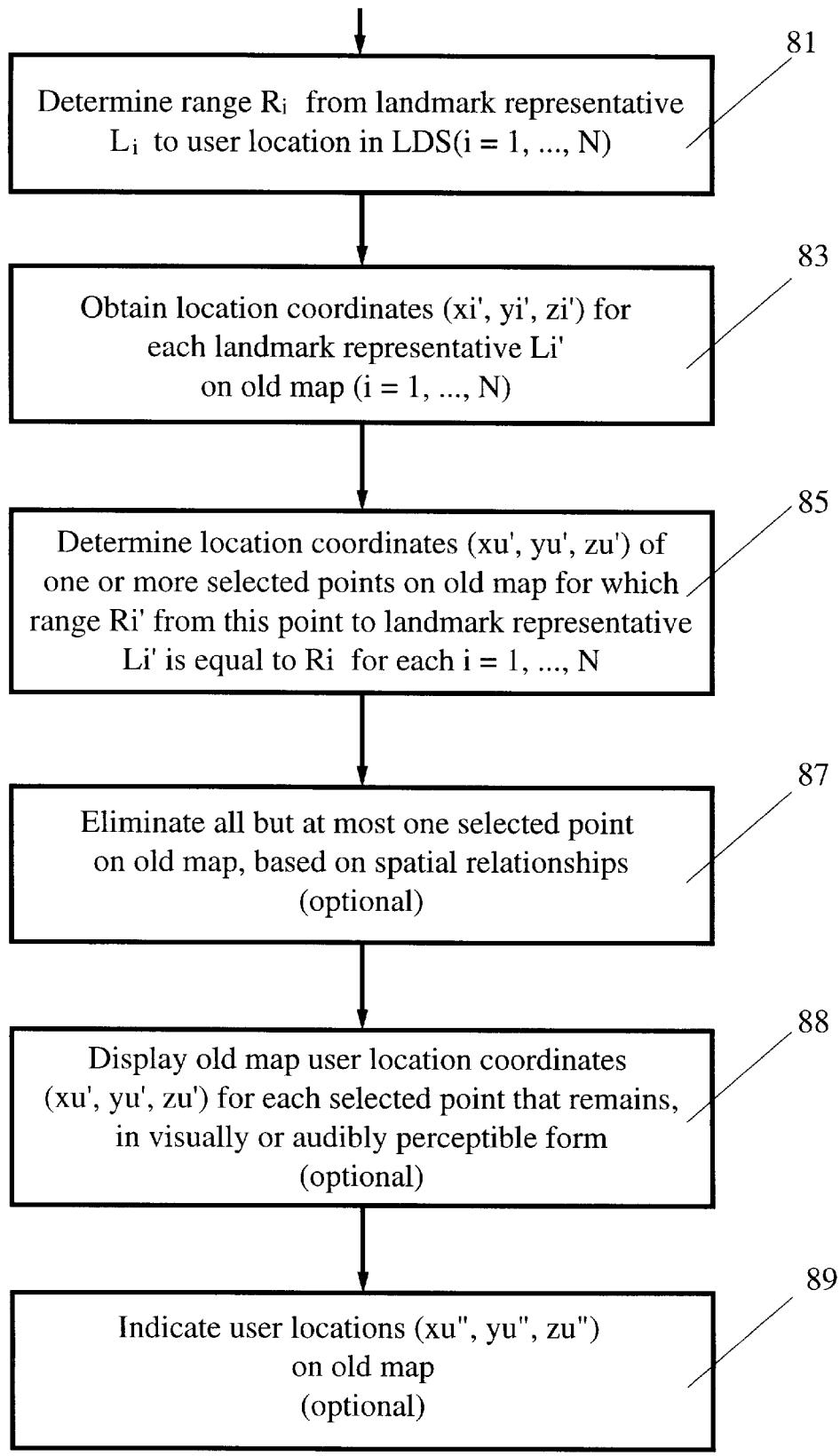

FIG. 8 is a flow diagram illustrating suitable procedures for practice of the tenth embodiment in two dimensions or of the ninth embodiment in three dimensions. In step 81, the range Ri (i=1, 2, . . . , N) from each of N landmark representatives Li to the user location in the LDS is determined; N=2 for two dimensions and N=3 for three dimensions. In step 83, location coordinates for the N corresponding old map landmark representatives Li' are determined. In step 85, at least one selected old map point is found for which the range Ri' to the landmark representative Li' is equal to Ri (i=1, ..., N). In step 87 (optional), all but at most one selected point on the old map are eliminated, based on spatial relationships to two or more of the landmark representatives. The user location coordinates on the old map found in the procedure in FIG. 8 can be displayed in visually perceptible form or in audibly perceptible form in step 88 (optional). The estimated user location on the old map can be indicated on the old map in step 89 (optional).

The preceding estimates of the user location vector on the old map do not address other important questions. First, which estimated user location vector should be chosen, and what criteria should be used to make this choice? Second, when, if at all, should the user be advised that this estimated user location vector pu"", or the difference between this vector and the LDS-determined vector pu, falls in a range that casts doubt on the validity of the choice of the vector pu""?

For ease of reference in the following discussion, a location can be 1 5 referred to by its location coordinates, for example, (xu,yu) or (xu,yu,zu), or by the corresponding vector, for example, pu=xu I+yu J+zu K, drawn from the origin to that location. For purposes of this discussion, it is assumed that the geographic region of interest contains a natural boundary B that the user wishes to avoid. If the user is a waterborne vessel, this boundary B might be a nominal boundary between the water on which the vessel operates and the adjacent land. This natural boundary B may be two-dimensional or may be three-dimensional.

Figure 9:
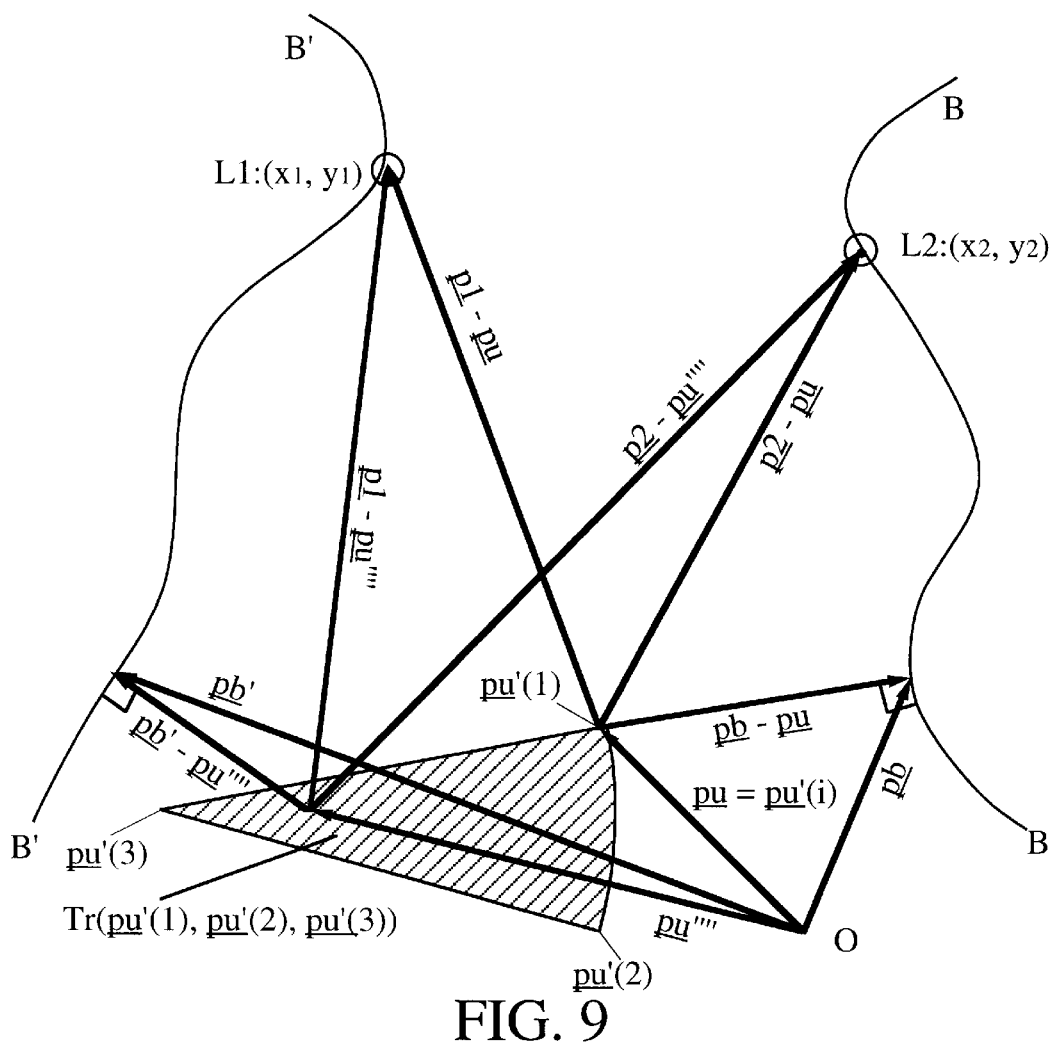
FIG. 9 illustrates locations employed in defining several metrics used in assessing the validity of the estimated user location on the old map.

With reference to the first of the questions posed above, FIG. 9 illustrates an LDS-determined two-dimensional surface (or a projection of a three-dimensional space on a two-dimensional surface) on which the following user locations are shown: (1) the vectors pu, pu', pu'(1), pu'(2), pu'(3) and pu""(c1,c2)=c1 pu'(1)+c2 pu'(2)+(1−c1−c2) pu'(3) ; (2) the triangle Tr(pu'(1),pu'(2),pu'(3))={p=c1 pu'(1)+c2 pu'(2) +(1−c1−c2) pu'(3)|0≤c1≤1, 0≤c2≤1, 0≤c1+c2≤1}, which is the set of all vectors pu""(c1,c2) generated by all convex linear combinations of three candidate user location vectors pu'(i) (i=1,2,3); (3) a vector pb−pu that extends from p to a point or location X on a natural boundary B that is closest to the location pu (the location on the LDS-determined boundary B for which |pb−pu| is a minimum); (4) a vector pb'−pu' that extends from pu' to a location pb' on the boundary B that is closest to the location pu"" (the location on the boundary B for which |pb'−pu'| is a minimum); (5) the vectors p1−pu and p2−pu and p3−pu that extend from the vector pu to landmark locations p1, p2 and p3 (or p1'−pu', p2'−pu' and p3'−pu') used in determining pu""; and (6) the vectors p1−pu"", p2−pu"" and p3−pu""that extend from the vector pu"" to a landmark location used in determining pu"". Landmark representatives may be, but need not be, located on or near a natural boundary B.

Several dimensionless "metrics" are now defined and applied to a situation illustrated in FIG. 9. In the following discussion of metrics, two landmark locations will be used for illustrative purposes. Extension of these metrics to use of three, four or more landmark locations should be obvious from the context.

A first metric is the distance between pu"" and pu (for a particular choice of the coefficients c1 and c2) divided by the minimum of the distances from pu to the landmark locations p1 and p2, defined as $$\rho1=|pu-pu''''|/min\{|p1-pu|,|p2-pu|\} \tag{239}$$

The quantity ρ1 is the ratio of a deviation distance, |pu−pu""|, between the LDS-determined user location and the estimated user location shown on the old map, divided by the distance between the LDS-determined user location and the nearest landmark location used in estimating the user location on the old map. A suitable criterion for acceptance of the vector pu"" estimating the vessel location on the old map is that $$\rho1 \leq f1, \tag{240}$$

where f1 is a selected fraction in the range 0≤f1≤1.0, and preferably 0≤f1≤0.5, and more preferably, 0≤f1≤0.2.

A second metric, related to the first metric, is defined by $$\rho1=|pu-pu''''|/min\{|p1-pu|,|p2-pu|\} \tag{241}$$

with corresponding criterion $$\rho2 \leq f2, \tag{242}$$

where f2 is a suitable fraction in the range 0≤f2≤1.0, and preferably 0≤f2≤0.2, and more preferably, 0≤f2≤0.2.

A third metric involves the distance |pb−pu| of the location pu from the nearest location pb on the boundary B to the location pu and is defined as $$\rho3 = \max_{pb \in B}|\underline{pu} - \underline{pu}''''|/|\underline{pb} - \underline{pu}| = |\underline{pu} - \underline{pu}''''|/\min_{pb \in B}|\underline{pb} - \underline{pu}|. \tag{243}$$

A suitable criterion for acceptance of the vector pu"" representing the user location on the old map is that $$\rho3 \leq f3, \tag{244}$$

where f3 is a selected fraction in the range 0≤f3≤1.0, and preferably 0≤f3≤0.5, and more preferably, 0≤f3≤0.2.

A fourth metric, related to the third metric, involves the distance |pb'−pu""| of the location pu"" from the nearest location pb' on the boundary B and is defined as $$\rho4 = \max_{pb' \in B}|\underline{pu} - \underline{pu}''''|/|\underline{pb}' - \underline{pu}''''| = |\underline{pu} - \underline{pu}''''|/\min_{pb' \in B}|\underline{pb}' - \underline{pu}''''|. \tag{245}$$

A suitable criterion for acceptance of the vector pu"" representing the user location on the old map is that $$\rho4 \leq f4, \tag{246}$$

where f4 is a selected fraction in the range 0≤f4≤1.0, and preferably 0≤f4≤0.5, and more preferably, 0≤f4≤0.2.

A fifth metric, useful where the vector pu"" has been determined using the fifth embodiment or the sixth embodiment in two dimensions or the fifth embodiment in three dimensions, is $$\rho5=|pu-pu''''|/\{2\epsilon\}^{1/2}, \tag{247}$$

where ε is defined in Eq. (64) or in Eq. (80) or in Eq. (177). A suitable criterion for acceptance of the vector pu"" representing the user location on the old map is that $$\rho5 \leq f5, \tag{248}$$

where f5 is a selected fraction in the range 0≤f5≤1, and preferably 0≤f5≤0.5, and more preferably, 0≤f5≤0.2.

The dimensionless ratios ρ1, ρ2, ρ3, ρ4 and ρ5 relate the deviation distance, |pu−pu""| or |pu−pu'|, between the LDS-determined user location and the estimated user location on the old map, and a distance of one of these locations from a landmark location or from a nearest point on an important boundary that is part of the local geography. Other metrics can be defined and used here as well. The set of all locations on the triangle Tr(pu'(1),pu'(2),pu'(3)), or some portion thereof, can be used to minimize the value of a particular metric (i=1,2,3,4,5) that is used.

For each of these metrics, a smaller value is preferable to a larger value. Minimization of the value of a given metric $\rho i$, by choice of the parameter values c1 and c2 in the definition of the location pu'''' in Eq. (238), is appropriate in some circumstances. One could, for example, choose c1=c2=0 and pu'(3)=pu so that pu''''=pu. A particular choice for pu'''', may not be appropriate if the user is a waterborne vessel and the location pu'''', as shown on the old map, appears on land.

Minimization of the metric value $\rho 1$ with respect to c1 and c2 requires computation of $$\min_{0 \leq c1 \leq 1} \min_{0 \leq c2 \leq 1} \rho 1 = \tag{249}$$

$$\min_{0 \leq c1 \leq 1} \min_{0 \leq c2 \leq 1} \{|c1\underline{pu}'(1) + c2pu'(2) +$$

$$(1 - c1 - c2)\underline{pu}'(3) - \underline{pu})|\}/\min\{|\underline{p1} - \underline{pu}|, |\underline{p2} - \underline{pu}|, |\underline{p3} - \underline{pu}|\},$$

where the denominator is not part of the minimization process with respect to the parameters c1 and c2.

However, minimization of the metric value $\rho 2$ requires computation of $$\min_{0 \leq c1 \leq 1} \min_{0 \leq c2 \leq 1} \rho 2 = \tag{250}$$

$$\min_{0 \leq b1 \leq 1} \min_{0 \leq c2 \leq 1} \{|c1\underline{pu}'(1) + c2\underline{pu}'(2) +$$

$$(1 - c1 - c2)\underline{pu}'(3) - \underline{pu}|/\min\{|c1\underline{pu}'(1) + c2\underline{pu}'(2) +$$

$$(1 - c1 - c2)\underline{pu}'(3) - \underline{p1}|, |c1\underline{pu}'(1) + c2\underline{pu}'(2) + (1 - c1 - c2)\underline{pu}'(3) -$$

$$\underline{p2}|, |c1\underline{pu}'(1) + c2\underline{pu}'(2) + (1 - c1 - c2)\underline{pu}'(3) - \underline{p3}|\}.$$

Here, the choice of the parameters c1 and c2 affects both numerator and denominator. For this reason, use of the metric $\rho 1$ may be preferable to use of the metric $\rho 2$. Similar minimizations of the metric values $\rho 3$ and/or $\rho 4$ can be implemented, but these considerations are more complex because distances from a boundary B are also part of the minimization process.

The second question posed above concerns validity of the choice pu'''' and when the user should be advised that the magnitude of the difference between the estimated user location vector pu'''' and the LDS-determined user location vector pu, falls in a range that casts doubt on the validity of the choice of the vector pu''''. Here again, the metrics can be used to define extant conditions when the user should be so advised. If the deviation distance |pu−pu''''| is at least as large as a distance of one of these locations from a landmark location or from a nearest point on an important boundary, that is, if $$\rho i \geq F (i=1,2,3,4 \text{ or } 5), \tag{251}$$

with F $\geq 1$, or preferably F$\geq 0.5$, the estimated vessel location pu'''' on the old map should be used with caution, or not at all.

The illustration in FIG. 9 of the quantities used to define the metrics $\rho 1$, $\rho 2$, $\rho 3$, $\rho 4$ and $\rho 5$ and the criteria associated with each have been presented in a two-dimensional setting. The metric definitions and criteria are applicable to, and unchanged in, a three-dimensional setting, in which the two-dimensional boundary B is replaced by a three-dimensional boundary B.

Figure 10:
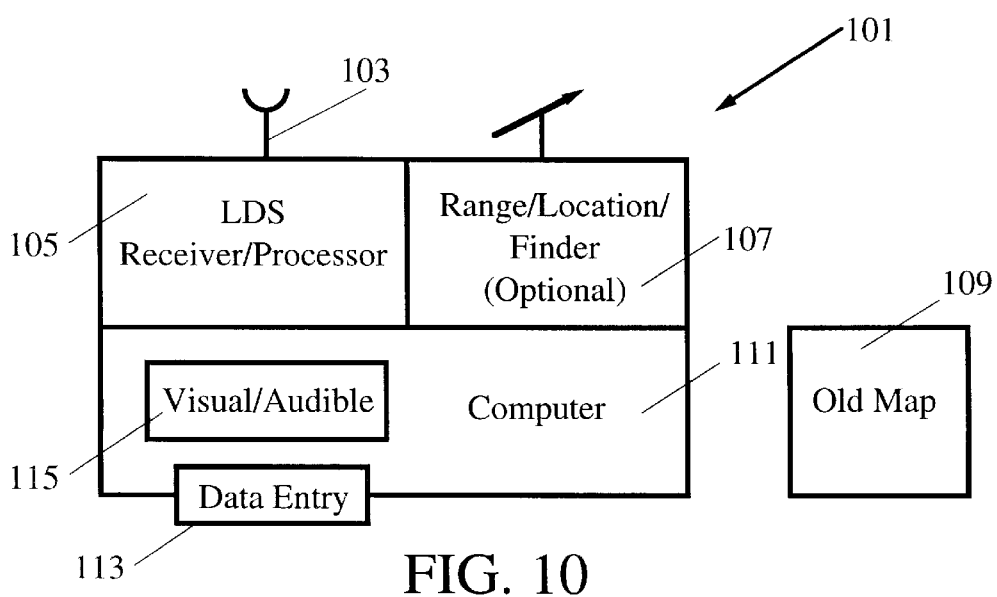
FIG. 10 shows apparatus suitable for practicing the invention.

FIG. 10 illustrates apparatus 101 suitable for practicing the invention, including an LDS antenna 103 that receives and passes LDS signals to an LDS receiver/processor 105 for determination of the location of the LDS antenna (user location). A range/angle/location finder 107 (optional), such as the apparati disclosed in the patent applications of Gilbert et al patent or Janky et al, discussed below, or other suitable apparatus, can be used to determine the location coordinates of a landmark spaced apart from the apparatus 101, if these coordinates are not already determined and stored. The location coordinates of two or more landmarks from an old map 109 are entered into a computer 111, using a keyboard or other data entry device 113. The LDS receiver/processor 105 works with, and may be a part of, the computer 113 to estimate user location coordinates on the old map 109 and displays these coordinates visually or audibly on a display 115. If the old map 109 is entered as an electronic map in the computer 111, the electronic version of this map can be displayed visually and the user location can be indicated on this electronic version.

The invention can be used with any LDS that provides location coordinates with acceptable accuracy. A satellite-based LDS, such as the Global Positioning System (GPS) or the Global Orbiting Navigational Satellite System (GLONASS), can be used here. Alternatively, a ground-based LDS, such as Loran, Tacan, Decca, Omega, VOR, DME, JTIDS or PLRS, can be used here. Alternatively, an FM subcarrier system, as discussed in U.S. Pat. No. 5,173,710, issued to Kelley, Rackley and Berglund, can be used.

A Satellite Positioning System (SATPS) is a system of satellite signal transmitters, with receivers located on the Earth's surface or adjacent to the Earth's surface, that transmits information from which an observer's present location and/or the time of observation can be determined. Two operational systems, each of which qualifies as an SATPS, are the Global Positioning System and the Global Orbiting Navigational System.

The Global Positioning System (GPS) is part of a satellite-based navigation system developed by the United States Defense Department under its NAVSTAR satellite program. A fully operational GPS includes up to 24 satellites approximately uniformly dispersed around six circular orbits with four satellites each, the orbits being inclined at an angle of 55° relative to the equator and being separated from each other by multiples of 60° longitude. The orbits have radii of 26,560 kilometers and are approximately circular. The orbits are non-geosynchronous, with 0.5 sidereal day (11.967 hours) orbital time intervals, so that the satellites move with time relative to the Earth below. Theoretically, three or more GPS satellites will be visible from most points on the Earth's surface, and visual access to two or more such satellites can be used to determine an observer's position anywhere on the Earth's surface, 24 hours per day. Each satellite carries a cesium or rubidium atomic clock to provide timing information for the signals transmitted by the satellites. Internal clock correction is provided for each satellite clock.

Each GPS satellite transmits two spread spectrum, L-band carrier signals: an L1 signal having a frequency f1=1575.42 MHz and an L2 signal having a frequency f2=1227.6 MHz. These two frequencies are integral multiples f1=1540 f0 and f2=1200 f0 of a base frequency f0=1.023 MHz. The L1 signal from each satellite is binary phase shift key (BPSK) modulated by two pseudo-random noise (PRN) codes in phase quadrature, designated as the C/A-code and P-code. The L2 signal from each satellite is BPSK-modulated by only the P-code. The nature of these PRN codes is described below.

One motivation for use of two carrier signals L1 and L2 is to allow partial compensation for propagation delay of such a signal through the ionosphere, which delay varies approximately as the inverse square of signal frequency f (delay $\propto f^{-2}$). This phenomenon is discussed by MacDoran in U.S. Pat. No. 4,463,357, which discussion is incorporated by reference herein. When transit time delay through the ionosphere is determined, a phase delay associated with a given carrier signal can be determined.

Use of the PRN codes allows use of a plurality of GPS satellite signals for determining an observer's position and for providing navigation information. A signal transmitted by a particular GPS signal is selected by generating and matching, or correlating, the PRN code for that particular satellite. All PRN codes are known and are generated or stored in GPS satellite signal receivers carried by ground observers. A first PRN code for each GPS satellite, sometimes referred to as a precision code or P-code, is a relatively long, fine-grained code having an associated clock or chip rate of 10 f0=10.23 MHz. A second PRN code for each GPS satellite, sometimes referred to as a coarse/acquisition code or C/A-code, is intended to facilitate rapid satellite signal acquisition and hand-over to the P-code and is a relatively short, coarser-grained code having a clock or chip rate of f0=1.023 MHz. The C/A-code for any GPS satellite has a length of 1023 chips or time increments before this code repeats. The full P-code has a length of 259 days, with each satellite transmitting a unique portion of the full P-code. The portion of P-code used for a given GPS satellite has a length of precisely one week (7.000 days) before this code portion repeats. Accepted methods for generating the C/A-code and P-code are set forth in the document GPS Interface Control Document ICD-GPS-200, published by Rockwell International Corporation, Satellite Systems Division, Revision B-PR, 3 Jul. 1991, which is incorporated by reference herein.

The GPS satellite bit stream includes navigational information on the ephemeris of the transmitting GPS satellite and an almanac for all GPS satellites, with parameters providing corrections for ionospheric signal propagation delays suitable for single frequency receivers and for an offset time between satellite clock time and true GPS time. The navigational information is transmitted at a rate of 50 Baud. A useful discussion of the GPS and techniques for obtaining position information from the satellite signals is found in Tom Logsdon, *The NAVSTAR Global Positioning System*, Van Nostrand Reinhold, N.Y., 1992, pp. 1–90, incorporated by reference herein.

A second configuration for global positioning is the Global Orbiting Navigation Satellite System (GLONASS), placed in orbit by the former Soviet Union and now maintained by the Russian Republic. GLONASS also uses 24 satellites, distributed approximately uniformly in three orbital planes of eight satellites each. Each orbital plane has a nominal inclination of 64.8° relative to the equator, and the three orbital planes are separated from each other by multiples of 120° longitude. The GLONASS circular orbits have smaller radii, about 25,510 kilometers, and a satellite period of revolution of 8/17 of a sidereal day (11.26 hours). A GLONASS satellite and a GPS satellite will thus complete 17 and 16 revolutions, respectively, around the Earth every 8 days. The GLONASS system uses two carrier signals L1 and L2 with frequencies of f1=(1.602+9 k/16) GHz and f2=(1.246+7 k/16) GHz, where k (=0, 1, 2, . . . , 23) is the channel or satellite number. These frequencies lie in two bands at 1.597–1.617 GHz (L1) and 1,240–1,260 GHz (L2). The L1 code is modulated by a C/A-code (chip rate=0.511 MHz) and by a P-code (chip rate=5.11 MHz). The L2 code is presently modulated only by the P-code. The GLONASS satellites also transmit navigational data at a rate of 50 Baud. Because the channel frequencies are distinguishable from each other, the P-code is the same, and the C/A-code is the same, for each satellite. The methods for receiving and analyzing the GLONASS signals are similar to the methods used for the GPS signals.

Reference to a Satellite Positioning System or SATPS herein refers to a Global Positioning System, to a Global Orbiting Navigation System, and to any other compatible satellite-based system that provides information by which an observer's position and the time of observation can be determined, all of which meet the requirements of the present invention.

A Satellite Positioning System (SATPS), such as the Global Positioning System (GPS) or the Global Orbiting Navigation Satellite System (GLONASS), uses transmission of coded radio signals, with the structure described above, from a plurality of Earth-orbiting satellites. A single passive receiver of such signals is capable of determining receiver absolute position in an Earth-centered, Earth-fixed (ECEF) coordinate reference system utilized by the SATPS.

A configuration of two or more receivers can be used to accurately determine the relative positions between the receivers or stations. This method, known as differential positioning, is far more accurate than absolute positioning, provided that the distances between these stations are substantially less than the distances from these stations to the satellites, which is the usual case. Differential positioning can be used for survey or construction work in the field, providing location coordinates and distances that are accurate to within a few centimeters.

In differential position determination, many of the errors in the SATPS that compromise the accuracy of absolute position determination are similar in magnitude for stations that are physically close. The effect of these errors on the accuracy of differential position determination is therefore substantially reduced by a process of partial error cancellation.

An SATPS antenna receives SATPS signals from a plurality (preferably three or more) of SATPS satellites and passes these signals to an SATPS signal receiver/processor, which (1) identifies the SATPS satellite source for each SATPS signal, (2) determines the time at which each identified SATPS signal arrives at the antenna, and (3) determines the present location of the SATPS antenna from this information and from information on the ephemerides for each identified SATPS satellite. The SATPS signal antenna and signal receiver/processor are part of the user segment of a particular SATPS, the Global Positioning System, as discussed by Tom Logsdon, op cit.

Alternatively, the LDS signals may be Loran-C signals produced by three or more Loran signal sources positioned at fixed, known locations. A Loran-C system relies upon a plurality of ground-based signal towers 51, 53 and 55, preferably spaced apart 100–300 km, that transmit distinguishable electromagnetic signals that are received and processed by a Loran signal antenna 57 and Loran signal receiver/processor 59. A representative Loran-C system is discussed in *Loran-C User Handbook*, Department of Transportation, U.S. Coast Guard, Commandant Instruction M16562.3, May 1990, which is incorporated by reference herein. Loran-C signals use carrier frequencies of the order of 100 kHz and have maximum reception distances of the order of hundreds of kilometers. The combined use of FM signals for location determination inside a building or similar structure plus Loran-C signals for location determination outside a building or similar structure can also provide a satisfactory LD system in most urban and suburban communities.

Other ground-based radiowave signal systems that are suitable for use as part of an LD system include Omega, Decca, Tacan, JTIDS Relnav (U.S. Air Force Joint Tactical Information Distribution System) and PLRS (U.S. Army Position Location and Reporting System) and are summarized by Tom Logsdon, op cit, pp. 6–7 and 35–40, incorporated by reference herein.

Where an FM subcarrier LDS is used, the user wears a portable location determination (LD) unit that receives FM signals from three or more FM subcarrier signal sources and receives phase information from a fourth signal source. Each of the three FM sources has known location coordinates. A fourth signal source also receives the FM subcarrier signals from the three FM sources and, using knowledge of the locations of these three FM sources relative to its own location, determines the relative phases of the FM signals broadcast by these three FM sources and broadcasts this relative phase information. This relative phase information is received by the LD unit and used to determine the location of the LD unit by triangulation and/or phase matching of the FM subcarrier signals received from the three FM sources.

The FM subcarrier signal of interest may have an associated frequency of about $f_c \pm 19$ kHz, where $f_c$ is the FM carrier frequency that lies in the range 130–170 kHz. Alternatively, a higher order displacement from the carrier frequency (e.g., $f_c \pm 38$ kHz or $f_c \pm 57$ kHz) may be used. The sources of these FM subcarrier signals may be a plurality of FM broadcasting stations located near the user. In this event, the subcarrier signals are obtained by filtering the total FM signals (carrier signal plus message signal plus subcarrier signal) to remove all but a subcarrier signal of a chosen frequency. FM signals are less subject to noise and other interference than are other signals, such as AM signals. Alternatively, an FM subcarrier signal can be replaced by an AM subcarrier signal, which is obtained by filtering an AM signal at a frequency displaced from the AM carrier frequency by a relatively small amount. An LDS using FM subcarrier signals is described by Kelley, Rackley and Berglund in U.S. Pat. No. 5,173,710, incorporated by reference herein.

The Gilbert et al patent application, U.S. Pat. No. 08/115,432, discloses system apparatus and an associated method for accurately determining the location of a designated object that is separated by an arbitrary distance from the system equipment. The system first determines its own location, using differential SATPS signals that can be received and analyzed at two SATPS stations, one (reference) station having a known location and the other station being mobile or even portable. A vehicle containing the mobile SATPS station uses two SATPS antennas, separated by a fixed distance, so that a baseline or vector extending between these two antennas can be determined. A portable or hand-carried SATPS station may use one SATPS antenna or may use two SATPS antennas separated by a fixed distance. Use of two SATPS antennas, separated by a fixed distance, provides a baseline and baseline direction (e.g., a line passing through the centers of the two antennas) that replaces a baseline determined by a magnetic compass, where the compass information is suspect because of magnetic perturbations introduced by nearby large metal objects.

In the Gilbert et al invention, the length and angular orientation ("offset information") of a vector extending from one or both of the SATPS antennas to the object of interest are then determined, using optical, electro-optical, ultrasonic or other survey measurement means. The object location is then determined from knowledge of the SATPS antenna location and the offset information. The object location can be stored in an on-board memory, together with indicia identifying the object, or the object location and object indicia can be transmitted to a receiver for storage and/or further signal processing. The SATPS antennas and associated SATPS equipment can be mounted on a movable vehicle or can be carried into the field by a surveyor. An object to be mapped need only be visible from the surveyor's position and may be positioned at an arbitrary distance from the surveyor's position.

In one embodiment, the Gilbert et al invention uses a Satellite Positioning System (SATPS), such as GPS or GLONASS, to determine the SATPS location of a first reference SATPS station, whose location is known with high accuracy, and of a second portable and mobile SATPS station. The second SATPS station uses two SATPS signal antennas, positioned a fixed distance apart, to receive SATPS location determination signals from a plurality of SATPS satellites and to provide orientation of these two antennas relative to each other. Differential SATPS correction information for the first SATPS station may be used to correct the SATPS-determined location of the second station. Location determination means, positioned adjacent to the second station, visually determines the location of the designated object relative to the second station. The second station can be mounted on a vehicle, such as a truck or railroad car, or can be carried into and used in the field by a surveyor or mapper. Traditional methods of determining orientation, such as use of a magnetic compass, can be corrupted by the presence of a large metal-like structure, such as a vehicle body, but an SATPS is relatively unaffected by the presence of such bodies.

The Janky et al patent application, U.S. Pat. No. 08/191,815, discloses a location and attitude determination means for the observer position and offset measurement means for determination of the displacement coordinates between the observer and the target. The observer apparatus is truly portable and provides signal backup and signal optimization. The Janky et al invention uses a Satellite Positioning System (SATPS), such as a Global Positioning System (GPS), including two or more SATPS antennas connected to a common SATPS signal receiver/processor, to determine the location of one or more of these antennas and the angular orientation of the antenna mount configuration. A Satellite Positioning System (SATPS) is a system of satellite signal transmitters, with receivers located on the Earth's surface or adjacent to the Earth's surface, that transmits information from which an observer's present location and/or the time of observation can be determined.

The SATPS antennas in the Janky et al invention are mounted on a rangefinder/viewer device that is used to sight a target. The location coordinates of the SATPS unit (observer) and of the target relative to the SATPS unit are determined and added together to determine the location coordinates of the target, for fire control and/or target bombardment. The system is preferably a differential SATPS that can determine the location of each SATPS antenna with an inaccuracy of a few meters or less.

An inclinometer and/or azimuth angle sensor with electronic readout can serve as backup to determine the observer attitude or orientation, if one or more of the SATPS antennas is disabled or unavailable, but is not needed if the system operates in a normal manner. Alternatively and preferably, signal backup and signal optimization are provided by inclusion of one or more additional SATPS antennas on the observer apparatus; the inclinometer and azimuth angle sensor are then not needed for signal backup, nor for any other purpose. In one embodiment, at least four SATPS antennas are provided in a plane, with one of these antennas being located at or near the centroid of three other non-collinear antenna locations. This arrangement provides SATPS signal backup, and it provides SATPS signal checking and location optimization if all four antennas are working.

In the Janky et al invention, the target location coordinates, or the observer-target displacement coordinates, are displayed on the rangefinder image and thus will change as the rangefinder/viewer is focused on different targets, with the observer location being fixed and known. The displayed target location coordinates, or the rangefinder image and displayed target coordinates, can be electronically transmitted to a central station that controls the bombardment devices, or directly to a weapons delivery system.

Where two SATPS antennas are used in the Janky et al invention, the baseline of these antennas may be aligned along the target sighting line, and the rangefinder, but not the image viewer, can be deleted. Where three or more SATPS antennas are used, these antennas are arranged non-collinearly in a plane that includes or is parallel to a plane that includes the target sighting line. The SATPS antenna mount angular orientation is preferably fixed relative to the angular orientation of the rangefinder/viewer device.

I claim:

1. A method for determining the coordinates of a location in a region, with reference to a map that may be inaccurate and that indicates the locations of at least first and second landmarks, the method comprising the steps of:

receiving location determination (LD) signals at an LD unit, from each of a plurality of LD signal sources, where the LD unit can estimate the LD unit location and can estimate a vector from the LD unit location to a selected location that is visible to and spaced apart from the LD unit, and using the LD unit to estimate the LD unit location and to estimate first and second separation vectors from the LD unit to selected first and second visible landmarks, respectively, whose locations are shown on a map;

computing coordinates on the map of a location with vectors from the computed location to the first landmark and second landmark on the map that are approximately equal to the first separation vector and to the second separation vector, respectively; and interpreting the computed location coordinates as candidate coordinates for the LD unit on the map.

2. The method of claim 1, further comprising the steps of:

using said LD unit to estimate a third separation vector from said LD unit to a selected third visible landmark whose location is shown on the map; and computing coordinates on said map of a new location with vectors from the computed new location to said first landmark to said second landmark and to the third landmark on the map that are approximately equal to said first separation vector, to said second separation vector and to the third separation vector, respectively; and interpreting the computed new location coordinates as candidate coordinates of the LD unit on the map.

3. The method of claim 2, wherein said region is chosen to be a three-dimensional region.

4. The method of claim 1, wherein said region is three-dimensional, the method further comprising the steps of:

using said LD unit to estimate a third separation vector and a fourth separation vector from said LD unit to selected third and fourth visible landmarks, respectively, whose locations are shown on said map; and computing coordinates on said map of a new location with vectors from the computed location to said first landmark, to said second landmark, to the third landmark and to the fourth landmark on the map that are approximately equal to said first separation vector, to said second separation vector, to the third separation vector and to the fourth separation vector, respectively, interpreting the computed new location coordinates as candidate coordinates of the LD unit on the map.

5. A method for determining the coordinates of a location in a region, with reference to a map that may be inaccurate and that indicates the locations of at least first and second landmarks, the method comprising the steps of:

providing a map of a region that includes locations of at least first and second visible landmarks in a selected map coordinates system;

receiving location determination (LD) signals at an LD unit, from each of a plurality of LD signal sources, where the LD unit can estimate the LD unit location and can estimate a vector from the LD unit location to a selected location that is visible to and spaced apart from the LD unit, and using the LD unit to estimate the LD unit location and to estimate first and second separation vectors from the LD unit to selected first and second visible landmarks, respectively;

using a computer to compute coordinates on the map of a location with vectors from the computed location to the first and second landmarks that are approximately equal to the first separation vector and to the second separation vector, respectively; and interpreting the computed location coordinates as candidate coordinates for the LD unit on the map.

6. The method of claim 5, further comprising the steps of:

using said LD unit to estimate a third separation vector from said LD unit to a selected third visible landmark whose location is shown on the map; and using said computer to compute coordinates on said map of a new location with vectors from the computed location to said first landmark, to said second landmark and to the third landmark that are approximately equal to said first separation vector, to said second separation vector and to the third separation vector, respectively.

interpreting the computed new location coordinates as candidate coordinates of the LD unit on the map.

7. The method of claim 5, wherein said region is three-dimensional, the method further comprising the steps of:

using said LD unit to determine a third separation vector and a fourth separation vector from said LD unit to selected visible third and fourth landmarks, respectively, whose locations are shown on said map;

using said computer to compute coordinates on said map of a new location with vectors from the computed location to said first landmark, to said second landmark, to the third landmark and to the fourth landmark that are approximately equal to said first separation vector, to said second separation vector, to the third separation vector and to the fourth separation vector, respectively; and interpreting the computed new location coordinates as candidate coordinates of the LD unit on the map.

8. Apparatus for determining the coordinates of a location in a region, with reference to a map that may be inaccurate and that indicates the locations of at least first and second landmarks, the apparatus comprising:

a location determination (LD) unit that receives LD signals from a plurality of LD signal sources, that estimates the distance to a selected location that is visible to and spaced apart from the LD unit, that estimates location coordinates of the LD unit, and that can estimate the distance of the LD unit from each of selected first and second visible landmarks that have locations shown on a map; and a computer that receives the location coordinates of the LD unit location, that receives the estimated distances of the LD unit from the first and second landmarks, that receives the locations of the first and second landmarks, and that is programmed to determine the coordinates of a location on the map that is separated from the first and second landmarks on the map by approximately the respective first and second distances.

9. The apparatus of claim 8, wherein:

said LD unit can estimate a third distance from said LD unit to a selected third visible landmark whose location is shown on said map; and said computer receives the third distance and location of the third landmark and is programmed to determine the coordinates of a new location on the map that is separated from said first landmark, from said second landmark and from the third landmark on said map by approximately the respective first, second and third distances.

10. Apparatus for determining the coordinates of a location in a region, with reference to a map that may be inaccurate and that indicates the locations of at least first and second landmarks, the apparatus comprising:

a location determination (LD) unit that receives LD signals from a plurality of LD signal sources, that determines location coordinates of the LD unit from the LD signals received and that can estimate first and second separation vectors from the LD unit to selected first and second visible landmarks that have locations shown on a map; and a computer, that receives the location coordinates of the LD unit, that receives the first and second separation vectors, that receives the locations on the map of the first and second landmarks, and that is programmed to determine the coordinates of a location on the map that is separated from the first and second landmarks by approximately the respective first and second separation vectors.

11. The apparatus of claim 10, wherein:

said LD unit can estimate a third separation vector from said LD unit to a selected third visible landmark whose location is shown on said map; and said computer receives the third separation vector and map location of the third landmark and is programmed to determine a new location on the map that is separated from said first location, from said second location and from the third location by the respective first, second and third separation vectors.

12. The apparatus of claim 10, wherein:

said LD unit can estimate a third separation vector and a fourth separation vector from said LD unit to a selected third visible landmark and to a selected fourth visible landmark, respectively, whose locations are shown on said map; and said computer receives said third separation vector and said fourth separation vector and map location of the third landmark and the fourth landmark and is programmed to determine a new location on the map that is separated from said first location, from said second location, from the third location and from the fourth location by the respective first, second, third and fourth separation vectors.

* * * * *